US 6,585,162 B2

(12) United States Patent
Sandbach et al.

(10) Patent No.: US 6,585,162 B2
(45) Date of Patent: Jul. 1, 2003

(54) FLEXIBLE DATA INPUT DEVICE

(75) Inventors: David Lee Sandbach, London (GB); Christopher Chapman, Oxon (GB); Stuart Mark Walkington, Hertfordshire (GB)

(73) Assignee: Electrotextiles Company Limited, Hertfordshire (GB)

( * ) Notice: Subject to any disclaimer, the term of this patent is extended or adjusted under 35 U.S.C. 154(b) by 0 days.

(21) Appl. No.: 09/980,297
(22) PCT Filed: May 18, 2001
(86) PCT No.: PCT/GB01/02234
§ 371 (c)(1), (2), (4) Date: Nov. 29, 2001
(87) PCT Pub. No.: WO01/88683
PCT Pub. Date: Nov. 22, 2001

(65) Prior Publication Data
US 2002/0134828 A1 Sep. 26, 2002

(30) Foreign Application Priority Data
May 18, 2000 (GB) ............................................. 0011962
Nov. 2, 2000 (GB) ............................................. 0026807

(51) Int. Cl.$^7$ ................................................ G06F 7/10
(52) U.S. Cl. ................................................ 235/462.44
(58) Field of Search ........................ 235/462.43, 462.44

(56) References Cited

U.S. PATENT DOCUMENTS
5,459,461 A * 10/1995 Crowley et al. ............. 235/148
5,616,897 A    4/1997 Weber et al.

FOREIGN PATENT DOCUMENTS
DE    29512756    10/1995
WO    00 10878    3/2000

OTHER PUBLICATIONS
International Search Report—PCT/GB01/02234; EPO, Nov. 2, 2001.

* cited by examiner

Primary Examiner—Harold I. Pitts
(74) Attorney, Agent, or Firm—Harness, Dickey & Pierce, P.L.C.

(57) ABSTRACT

The present invention relates to a data input device suitable for inputting data to electronic processing means. The data input device is configured to produce an output in response to a mechanical interaction and may be reconfigured into two operational configurations. In a first flexible configuration the device may be bent or flexed about a first axis, and in a second rigid configuration the data input device is substantially rigid such that bending or flexing of the device about the first axis is inhibited.

23 Claims, 34 Drawing Sheets

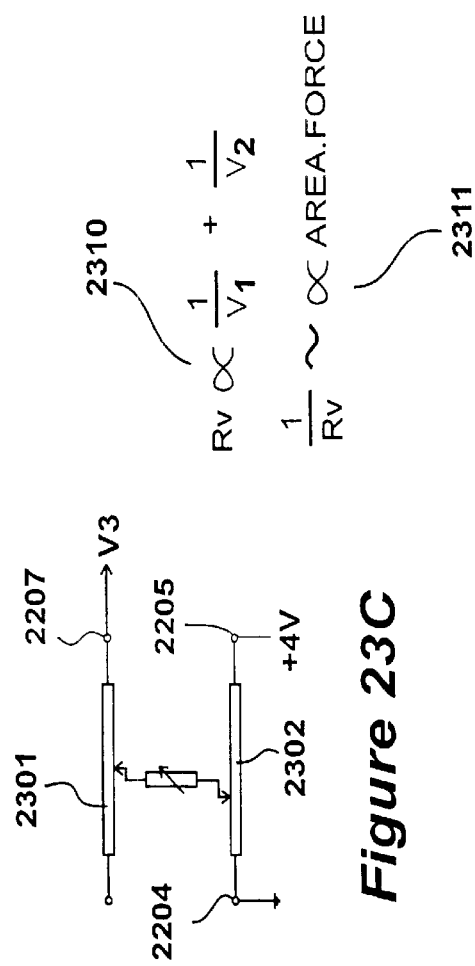
$$R_v \propto \frac{1}{V_1} + \frac{1}{V_2} \sim \propto AREA.FORCE$$
$\frac{1}{R_v}$
2310, 2311
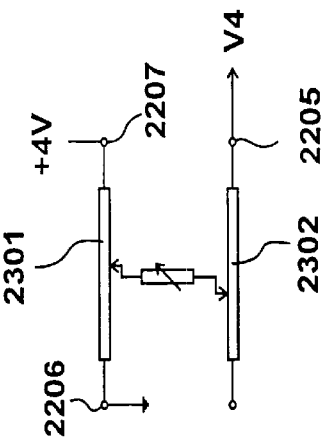
*Figure 23C*
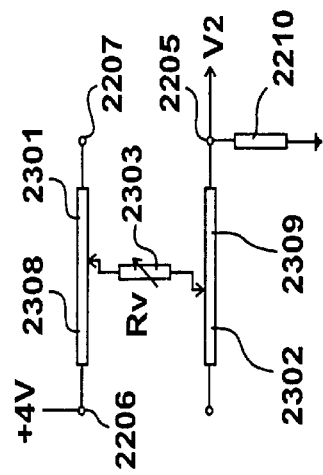
*Figure 23D*
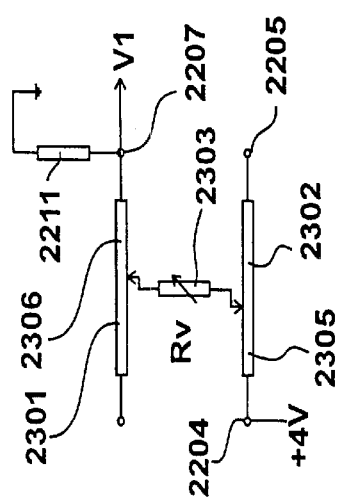
*Figure 23A*
*Figure 23B*

FLEXIBLE DATA INPUT DEVICE

BACKGROUND OF THE INVENTION

1. Field of the Invention

The present invention relates to data input devices and more particularly to flexible data input devices to be used in combination with electronic processing means.

2. Description of the Related Art

Data input devices, such as keyboards or game consoles, are well known to be used in combination with electronic processor devices to enable an operator to interact and input data to the electronic processor.

In the modem working environment, it is increasingly desirable to provide portable electronic processor devices to enable operators to use such devices in off-site or out of office locations where traditional desk top devices are not practical. Examples of such devices include cellular mobile phones, and hand-held electronic processor units such as those manufactured by Palm Incorporated and Handspring.

To enable and operator to conveniently input data into such portable electronic processors it is desirable to provide a portable data input device to be used in combination with the electronic processor device. Flexible data input apparatus, such as a flexible keyboard or mouse as described in the Applicant's co-pending international patent application numbers PCT/GB01/01425 and PCT/GB01/01444. Flexible devices are desirable due to the ease with which such devices may be folded or wrapped up for convenient storage and/or transportation.

A problem with flexible data input devices arises, however, in situations where there is no adequate support surface onto which the flexible data input device may be placed. The present invention provides a solution to such a problem enabling the use of a flexible data input device in situation where no suitable support surface is present.

BRIEF SUMMARY OF THE INVENTION

According to the present invention there is provided a data input device suitable for inputting data to electronic processing means and configured to produce an output in response to a mechanical interaction, wherein said data input device has a first flexible configuration, in which said device may be bent or flexed about a first axis; and a second rigid configuration in which said data input device is substantially rigid such that bending or flexing of said device about said first axis is inhibited.

By electronic processing means, we include any portable electronic processing device that may practicably be used in an off-site or out-of-office location.

By first axis we mean any axis about which the data input device may be bent to reconfigure the device from a substantially rigid configuration to a wrapped up configuration as described herein. In preferred embodiments of the invention, bending of the data input device about a first axis means bending of the device about an axis traversing the width of the device. Therefore, in preferred embodiments, in the second rigid configuration, bending about the first axis is inhibited thereby providing longitudinal support to the data input device along its length.

BRIEF DESCRIPTION OF THE SEVERAL VIEWS OF THE DRAWINGS

How the invention may be put into practice will now be described by example only in reference to the following figures in which:

FIGS. 23A, 23B, 23C and 23D detail schematically the pressure and positional measurements that can be made by the interface circuit identified in FIG. 22;

BEST MODE FOR CARRYING OUT THE INVENTION

FIG. 1

Figure 1:
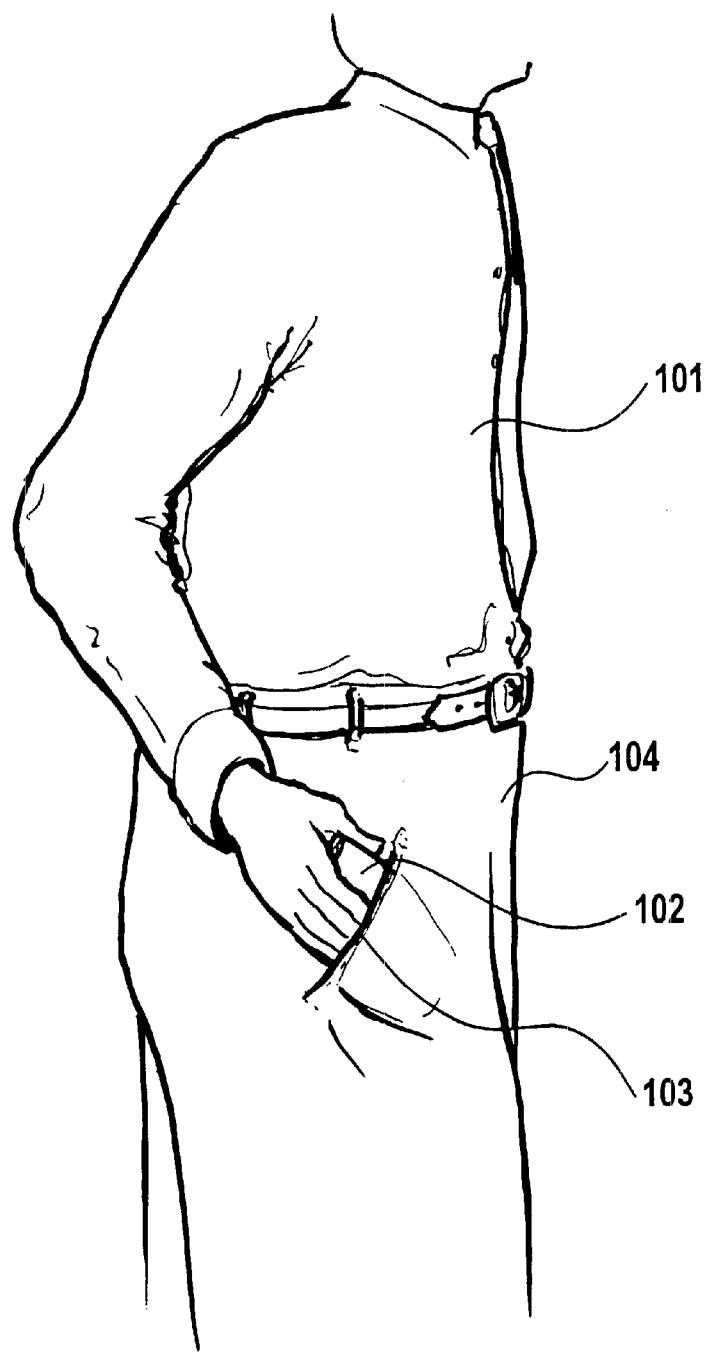
FIG. 1 shows an operator transporting an embodiment of the present invention in a wrapped up configuration.

An operator 101 is shown transporting a device 102 according to the present invention in FIG. 1. The device 102 is of suitable size and shape so as to enable convenient transportation in the pocket 103 of the operators' trousers 104. Alternatively, the device may be conveniently transported in a brief case or a bag. The device 102 comprises an electronic processor device, which is preferably a hand-held electronic processor device that is encapsulated within a protective covering which forms the external surface of the device 102. In this embodiment, the protective covering is formed by a flexible data input device which is wrapped around the electronic processor device during transportation and storage. The flexible data input device can be reconfigured to enable the operator to use the data input device in combination with an electronic processor to input data.

FIG. 2

Figure 2:
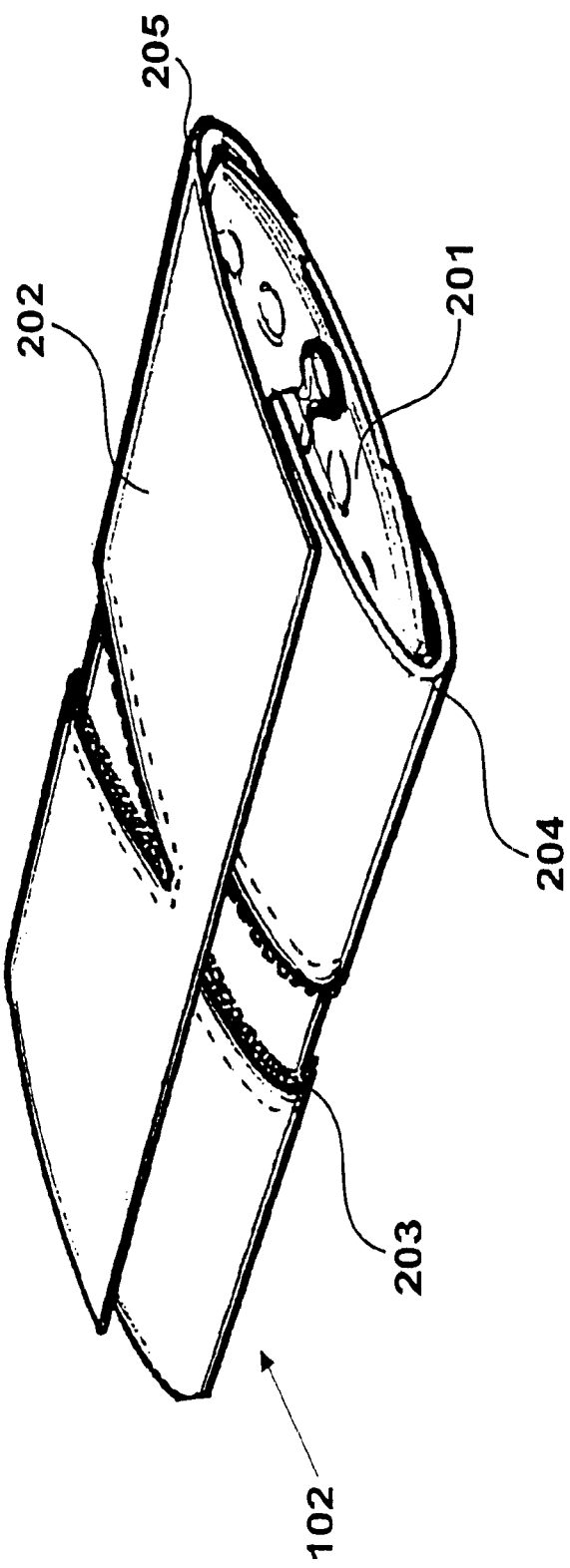
FIG. 2 is a perspective view of the device shown in FIG. 1.

A perspective view of the device 102 of the present invention is shown in FIG. 2 in a wrapped-up configuration. The hand-held electronic processor 201 is enclosed within the data input device which, in the present embodiment, is in the form of a flexible fabric keyboard 202. In this embodiment, the hand-held electronic processor device 201 is a Palm$^{RTM}$ Vx processor manufactured by Palm Incorporated.

In the wrapped-up configuration shown in FIG. 2, the fabric keyboard 202 forms a protective covering around the surface of the hand-held electronic processor 201. Hence, the fabric keyboard functions so as to provide protection against the scratching of the surface of the electronic processor and to provide a degree of cushioning against any adverse impacts to which the device 102 is exposed during transportation. In order to enable the data input device to be wrapped up around the electronic processor as shown in FIG. 2, it is an essential feature of the fabric keyboard 202 that it is sufficiently flexible so as to enable bending of the device around the electronic processor. The device shown in FIG. 2 has two bend portions 204 and 205 which correspond to bends formed in the fabric keyboard about first and second axes respectively. In the present embodiment, the first and second axes correspond to the edges of the electronic processor device 201 and are parallel to one another.

Additionally, a zip fastener 203 is visible on the external surface of the fabric keyboard 202. In the wrapped up configuration shown in FIG. 2, the zip fastener 203 is in an open state and the purpose of the zip fastener will be explained further in reference to FIGS. 8A, 8B, 9A and 9B.

FIG. 3

Figure 3:
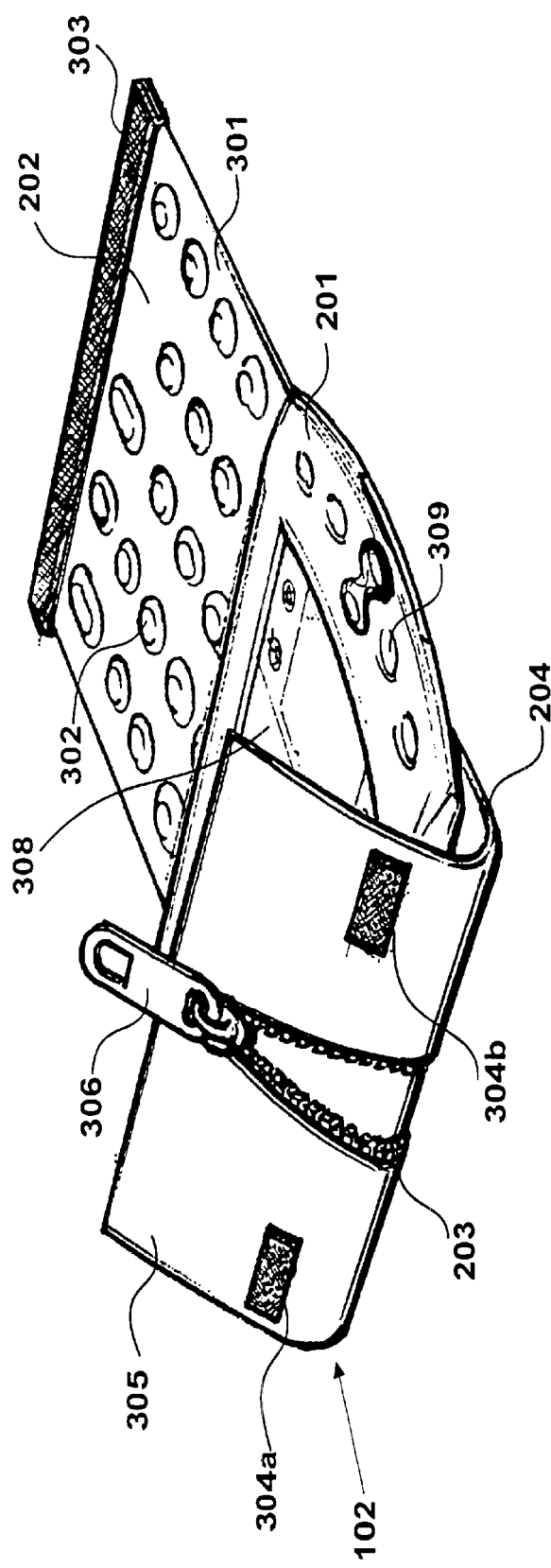
FIG. 3 is a perspective view of the device shown in FIG. 2 in a part-unfolded configuration.

The device 102 illustrated in a wrapped-up configuration in FIG. 2 is shown in a part-unfolded configuration in FIG. 3. In the part-unfolded configuration shown in FIG. 3, the fabric keyboard 202 has a first lateral portion 301 which has been completely unfolded to reveal a portion of the internal surface of the keyboard 202. Located on the internal surface of the fabric keyboard 202 are key registration devices, such as 302, which correspond to specific alpha numerical or functional data inputs. In addition, extending along an edge of the internal surface of the first lateral portion 301 is a hook strip 303, which forms part of a hook and loop fastener such as Velcro. The hook strip 303 releasably engages with the loop strips 304a and 304b that are located on the external surface of the second lateral portion 305 of keyboard 102. The second lateral portion 305 of fabric keyboard 202, as shown in FIG. 3, remains partly bent about a first axis as shown at bend portion 204. The engagement of the hook strip 303 with the loop strips 304a and 304b retains the keyboard 202 in the wrapped configuration shown in FIG. 2. In an alternative embodiment, loop strips 304a and 304b are replaced with male press stud elements which releasably engage with corresponding female press stud elements that replace the hook strip 303 on the internal surface of portion 301 to secure the device in the wrapped up configuration.

The zip fastener 203 remains in the open position on the external surface of the fabric keyboard 202 with the zip fastener runner element 306 in a retracted position adjacent to the edge of the second lateral portion 305 of fabric keyboard 202.

As shown in FIG. 3, the user interface of the electronic processor device 201 is revealed by the folded back first and second lateral portions 301 and 305 of the fabric keyboard 202. In this part unfolded configuration, the electronic processor device 201 sits on a central portion of the fabric keyboard 202 and the user interface of the electronic processor device 201 may be accessed by an operator. The user interface of the electronic processor device 201 comprises a screen 308 and operational selection buttons, such as 309, by which the operator may interact with the device 201 to select, view or input data.

Once the operator has finished using the user interface of the electronic processor device 201, the flexible fabric keyboard 202 may be reconfigured to the wrapped up configuration as shown in FIG. 2 for transportation or storage. However, if the operator wishes to use the fabric keyboard 202 in combination with the electronic processor device 201 to input data then the device 102 is reconfigured into a first flexible operational configuration as shown in FIG. 4.

FIG. 4

Figure 4:
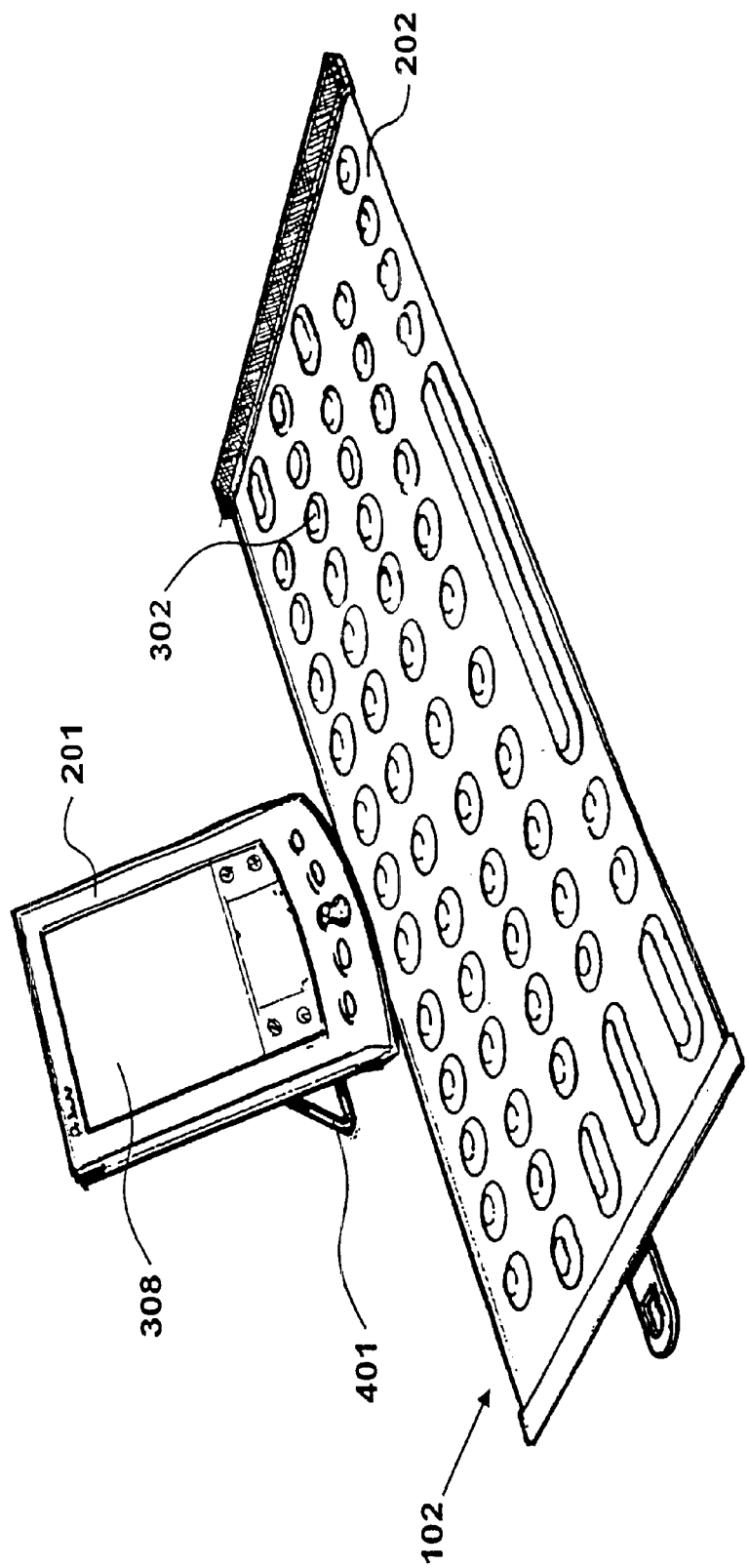
FIG. 4 is a further perspective view of the device shown in FIG. 2 in a first flexible operational configuration.

In the first flexible operational configuration, as shown in FIG. 4, the electronic processor 201 is displaced from the central portion of the internal surface of the fabric keyboard 202 to reveal the entire keyboard surface. The electronic processor 201 is positioned centrally along the top edge of the fabric keyboard 202 and is supported in an elevated position relative to the plane of the fabric keyboard by support leg 401. In this configuration, an operator may use the fabric keyboard 202 to input data into the electronic processor device 201 by depressing key registration devices, such as 302, which corresponds to a specific alpha numerical or functional data input.

The electronic processor 201 displays data inputs from the fabric keyboard on screen 308 so as to enable an operator to view the data inputs in a similar manner to that experienced when using a conventional typing system such as a desktop or lap top computer system. It is also a feature of hand held electronic processors, such as the Palm$^{RTM}$ Vx processor, to have an on-screen keyboard display by which an operator can select individual data inputs by contacting the appropriate alpha numerical or functional icon on the screen using a stylus. The use of a keyboard, such as fabric keyboard 202, is intended to replace this on-screen functionality by providing a more conventional keyboard and electronic processor combination which is larger and more familiar to most computer processor operators. Although not visible in FIG. 4, an electrical connection is formed between the fabric keyboard 202 and the electronic processor 201 via an interface circuit, the function and operation of which is described in more detail in reference to FIGS. 21 to 27.

The configuration shown in FIG. 4 provides a planar keyboard surface which may conveniently be used on a supporting surface such as a table or desktop. When an operator has finished using the keyboard 202 in combination with the electronic processor 201 the keyboard may be reconfigured into the wrapped-up configuration as shown in FIG. 2. Various approaches by which this may be achieved are described in the Applicant's co-pending International Patent Application No. PCT/GB01/01444.

FIG. 5

Figure 5:
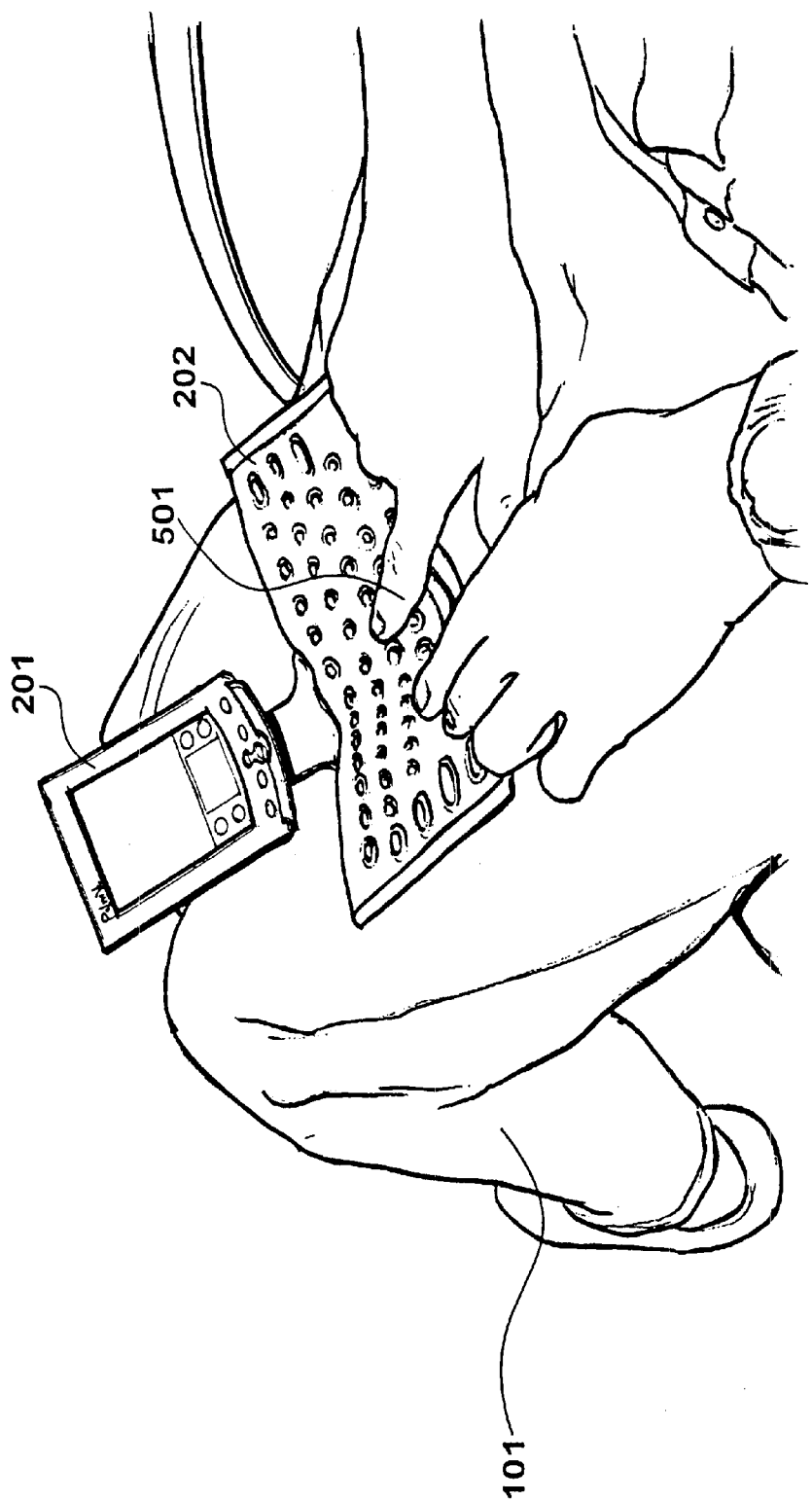
FIG. 5 shows an operator using the device shown in FIG. 4 on their lap in the first flexible operational configuration.

A problem occurs, however, when an operator wishes to use the fabric keyboard 202 in combination with the electronic processor 201 in a situation where there is no suitable support surface onto which the device may be placed, such as a table or desk top, and only an uneven surface is available. Such a situation is illustrated in FIG. 5 where an operator 101 is attempting to use the fabric keyboard 202 in a first flexible operational configuration on their lap. In this situation, the operator 101 has the electronic processor device 201 supported in an elevated position between his knees and the fabric keyboard 202 resting across their lap. In this situation, when the operator 101 interacts with the fabric keyboard 202 using finger 501, the fabric keyboard is caused to flex and bend under the pressure applied to press the keys to reflect the uneven surface onto which it has been placed. This is particularly disadvantageous as it reduces the accessibility of the key registration devices on the surface of the keyboard 202 as the keyboard contours the operators lap and hence, renders the fabric keyboard 202 difficult to use in such circumstances.

The present invention provides a solution to this problem by providing a data input device, such as fabric keyboard 202, that has a first flexible configuration in which the keyboard may be bent or flexed about an axis so as to enable the keyboard to be folded and wrapped-up around an electronic processor for transportation and storage, and a second rigid configuration in which the keyboard is substantially rigidised so as to inhibit bending or flexing of the device about an axis and to enable the keyboard to be self-supporting to facilitate use in situations where there is no suitable support surface, such as a table or desk top.

FIG. 6

Figure 6:
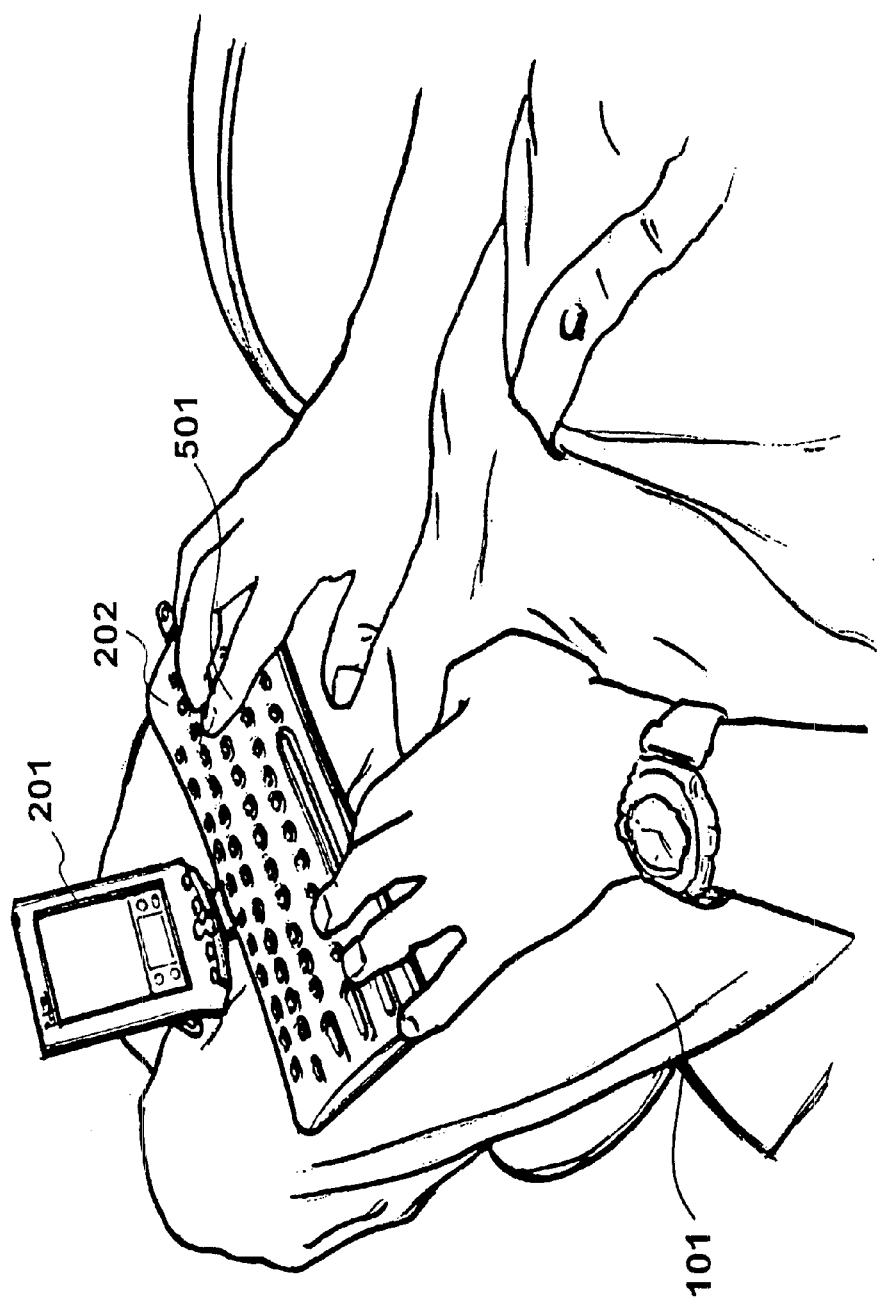
FIG. 6 shows an operator using the device on their lap in a second rigid operational configuration.

FIG. 6 shows the fabric keyboard 202 shown in FIG. 5 that has been reconfigured from a first flexible operational configuration into a second rigid configuration. As described before in reference to FIG. 5, an operator 101 is illustrated in FIG. 6 using the fabric keyboard 202, in a second rigid configuration, in combination with an electronic processor device 201 positioned on the operator's lap. In this second rigid configuration, however, the keyboard 202 has been substantially rigidised so as to prevent undesirable flexing, bending or buckling of the keyboard 202 following the application of a mechanical interaction on the keyboard surface by the operator's finger 501. Therefore, in this configuration, an operator is provided with a rigid keyboard surface which maintains the accessibility of all the key registration devices on the surface of the keyboard and facilitates the use of the keyboard in situations where there is no adequate support surface such as, for example, when placed on an operators lap. In other words, the disadvantages of a flexible keyboard 202 in such situations have been circumvented by the provision of a second rigidised configuration of the keyboard.

FIG. 6

When an operator has finished using the device, for example as shown in FIG. 6, the keyboard 202 may be reconfigured from the second rigid configuration to the first flexible configuration in which the keyboard may then be wrapped around the electronic processor device for storage or transportation, as previously illustrated.

FIG. 7

Figure 7:
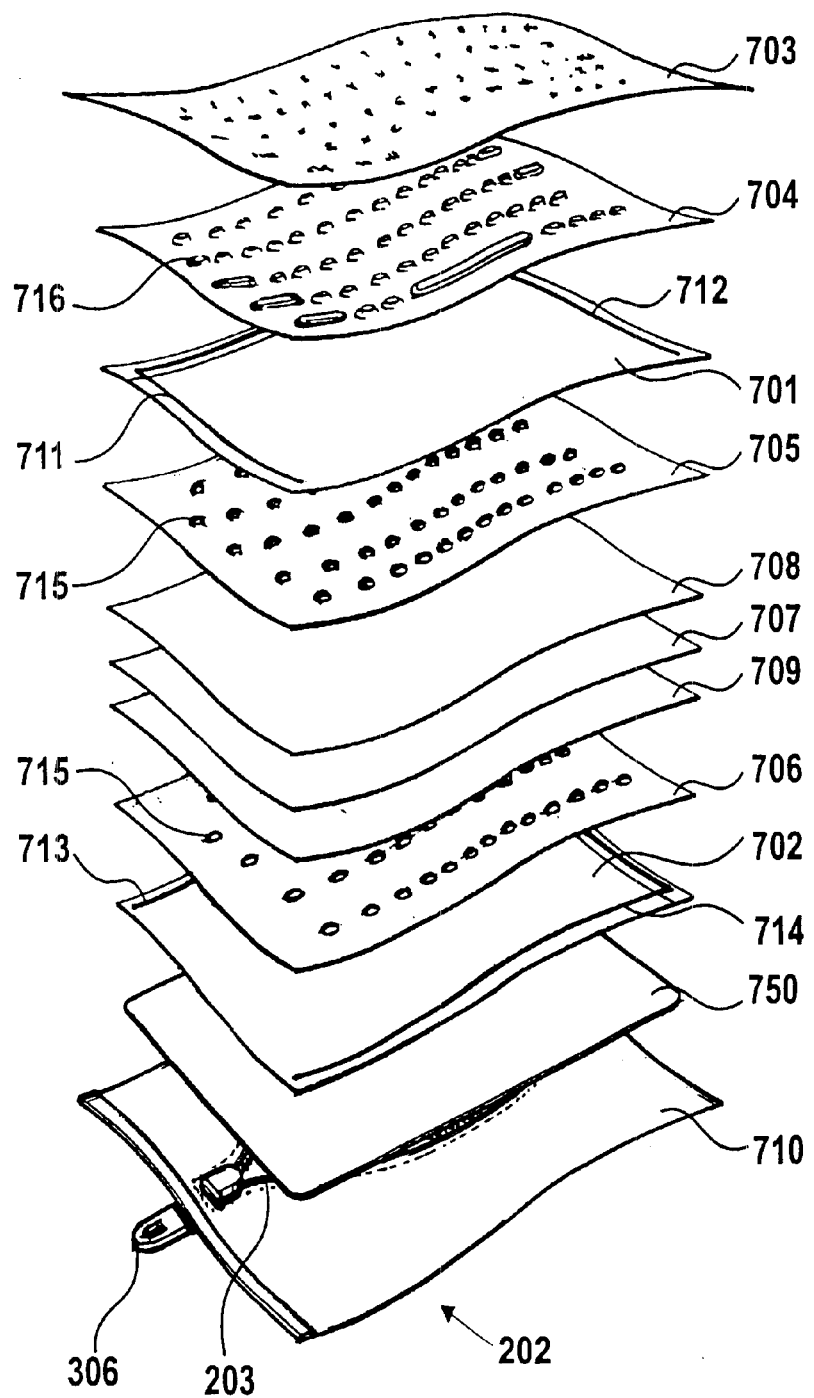
FIG. 7 is an exploded perspective view of a preferred embodiment of keyboard 202 illustrating the constituent layers.

An exploded view of the fabric keyboard 202 illustrating the constituent layers is shown in FIG. 7. The keyboard 202 comprises eleven constituent layers, including a first electrically conductive layer, 701 and a second electrically conductive layer 702. Both the electrically conductive layers 701 and 702 have electrically conductive carbon coated fibres woven or knitted together so that each conductive layer is capable of conducting an electrical current in any direction across its plane.

The first electrically conductive layer 701 has conductive tracks 711 and 712 forming an electrical contact along the left and right edges of layer 701 respectively. The conductive tracks 711 and 712 are composed of fabric coated with a conductive metal, such as silver or nickel. Material of this type is readily available and is used extensively for shielding equipment from electromagnetic interference. The conductive tracks 711 and 712 are secured to the conductive layer 701 using a suitable conductive adhesive such as a pressure sensitive acrylic adhesive incorporating small copper coated conductive glass spheres The conductive tracks 711 and 712 are highly conductive compared to the fabric layer 701. Accordingly, a voltage gradient may be applied across the first electrically conductive layer 701 between the right and left edges of the layer (i.e. in an X-axis direction).

Similarly, the second electrically conductive fabric layer 702 has conductive tracks 713 and 714 providing electrical contact along the top and bottom edges of layer 702 respectively. Accordingly, a voltage may be applied across the second electrically conductive fabric layer 702 in a direction perpendicular to the voltage which is applied across the first electrically conductive fabric layer 701 (i.e. the voltage across the layer 702 is in the Y-axis direction).

Both the first and second electrically conductive fabric layers 701 and 702 are discussed further in reference to FIG. 21.

The uppermost layer of the fabric keyboard 202 is a continuous fabric layer 703 which has printed on its upper surface graphical representations corresponding to the alpha numerical or functional data inputs to which each key on the keyboard surface corresponds. The graphical representations are preferably screen printed onto the fabric layer and during the preferred construction process the printing of the alpha numerical or functional graphical representations is performed once the fabric keyboard has been assembled. In addition, in the present embodiment, the fabric layer 703 is preferably made from a stretchable or heat formable fabric so as to enable the fabric to be manipulated to receive the protrusions of the over centre moulding layer 704.

The over centre moulding layer 704 is, in this embodiment, a continuous silicone rubber sheet having key registration device mouldings protruding on its upper surface. The key registration device mouldings protruding from the upper surface of layer 704 are specifically moulded so as to align with the alpha numerical or functional representations printed on the uppermost layer 703.

Located in between the first electrically conductive fabric layer 701 and the second electrically conductive fabric layer 702 are five further layers. A first masking layer 705 and a second masking layer 706 contact the innermost surfaces of the electrically conductive fabric layers 701 and 702 respectively. Both masking layers 705 and 706 are composed of a flexible tear resistant fabric with a laminate coating of polyurethane applied to one surface of the fabric. In an alternative embodiment, the masking layers 705 and 706 are sheets of polyurethane alone without any fabric constituent.

The series of circular holes 715 have been punched through the masking layers 705 and 706. Each of these holes is located so as to align with a corresponding key registration device moulding such as 716 of layer 704. During use of the keyboard, the masking layers prevent direct electrical contact occurring between the central conducting layer 707 (to be described later) and either of the first or second electrically conductive fabric layers 701 and 702, except at locations which correspond to the depression of a key registration device such as 716. Therefore, the accidental compression of a portion of the keyboard at locations between the key registration devices does not result in an output from the fabric keyboard.

Located in between the masking layers 705 and 706 are insulating mesh layers 708 and 709, which are positioned either side of the centrally conductive layer 707. The insulating layers 708 and 709 are composed of fabric fibres woven or knitted together with a relatively wide spacing between the fibres. This enables the first and second conductive layer to be physically separated from the central conductive layer 707 whilst enabling these layers to come into electrical contact when a mechanical pressure is applied to a key registration device of the keyboard. The presence of these insulating layers ensures that the overall construction may be bent, flexed or wrapped around objects without causing the two conductive layers to be brought into electrical contact and thereby producing an erroneous contact identification output.

The central conductive layer 707, located between the insulating mesh layers 708 and 709, is specifically configured to conduct an electric current from the upper surface of the layer to the lower surface of the layer without enabling any conduction along its plane. Therefore, the centrally conductive layer 707 is only conductive in a Z-axis direction though the plane of the layer 707.

The central conductive layer 707 is constructed by knitting a polyester yarn of twenty four decitex filament having a single conductive filament twisted therein, such that the conductive filament appears relatively randomly in the completed knitted product. In addition, the central conductive layer 707 has a conductance perpendicular to the plane of the device i.e. in the Z axis direction that increases as it is placed under pressure thereby facilitating conduction between the layers during a mechanical interaction.

Consequently, when a key registration device, such as 716 is pressed, the first electrically conductive fabric layer 701 is forced into close electrical contact with the centrally conductive layer 707 and the second electrically conductive layer 702 through holes 715 of masking layers 705 and 706 and the spaces between the fibres of mesh layers 708 and 709. Therefore, when a voltage is applied to the first conductive layer 701, a current passes from the first electrically conductive layer 701 through the central layer 707 and is discharged through the second electrically conductive layer (in the Z axis direction) at the location of the key registration device 716.

The purpose of the first electrically conductive layer 701, the second electrically conductive layer 702, the central conductive layer 707, masking layers 705 and 706 and insulating mesh layers 708 and 709 is to provide a layered assembly that is capable of detecting a mechanical interaction resulting from the depression of a key registration device on layer 704. The position of the mechanical interaction is determined using established methodology to be described later and this positional information is then correlated with a series of look-up tables to determine the identity and the function of the key that has been pressed. The process by which a mechanical interaction is detected and the position of the mechanical interaction is determined is described in more detail in reference to FIGS. 21 to 27.

Located underneath the second electrically conductive fabric layer 702 is a support layer 750. This layer is, in this embodiment, a layer of one millimeter thick polyurethane which is semi-flexible with a Shore hardness of approximately eighty Shore A. By semi-flexible we mean that the polyurethane may be bent or flexed when in a first flexible configuration which, in this embodiment, is when the sheet is flat. However, when the sheet is placed under elastic tension by, for example, forcing the top and bottom edges together to provide the sheet with an arched profile in one axis, the sheet becomes rigid and bending or flexing along other axes is inhibited. The material is therefore considered semi-flexible as the flexibility is configuration dependent in contrast to that of the flexible fabric layers wherein the flexibility is independent of the configuration of the layer.

A support layer with this property, in the flexible configuration, facilitates the folding and bending operations required to reconfigure the keyboard 202 into the wrapped configuration as shown in FIG. 2.

The support layer 750 is shown in FIG. 7 as a planar layer which represents the first flexible configuration of this layer which enables the layer to be bent or folded about an axis. This layer may also be reconfigured to a provide rigidity to the fabric keyboard 202 in a second rigid configuration in which the folding or flexing of the layer about an axis is inhibited. This layer will be discussed in more detail in reference to FIGS. 8A, 8B, 9A and 9B.

In an alternative embodiment, support layer 750 is made of an alternative plastics material such as polypropylene.

A final layer of the keyboard 202 that forms the external surface on the underside of the device is fabric layer 710. This fabric layer forms the undersurface of the keyboard and the external surface of the device 102 when reconfigured to the wrapped-up configuration. To provide sufficient durability, this fabric layer is preferably manufactured from a durable and stretch resistant fabric material such as Rip Stop nylon. Fabric layer 710 also comprises the zip fastener 203 with a zip fastener element 306 shown in FIG. 7 in the retracted position with the zip fastener 203 open. The function of this zip fastener will be discussed further in reference to FIGS. 8A, 8B, 9A and 9B.

The uppermost fabric layer 703 and the lower most fabric layer 710 both extend beyond the dimensions of all of the other layers so as to enable the upper and lower most fabric layers to be secured together by stitching or by the use of an adhesive, thereby encapsulating and retaining the inner layers together in the arrangement shown in FIG. 7.

To enable reconfiguration of the keyboard it is advantageous that all the fabric layers of the keyboard 202, with the exception of the support layer and the lower most fabric layer 710, have a degree of elasticity to enable stretching of the fabric layers and permit a degree of relative sheer movement of the fabric layers during reconfiguration.

The lower most fabric sheet 710 is preferably inextendible with low inherent elasticity to enable this layer to function in the conversion of the fabric keyboard from a flexible to a rigid configuration.

FIG. 8

Figure 8A:
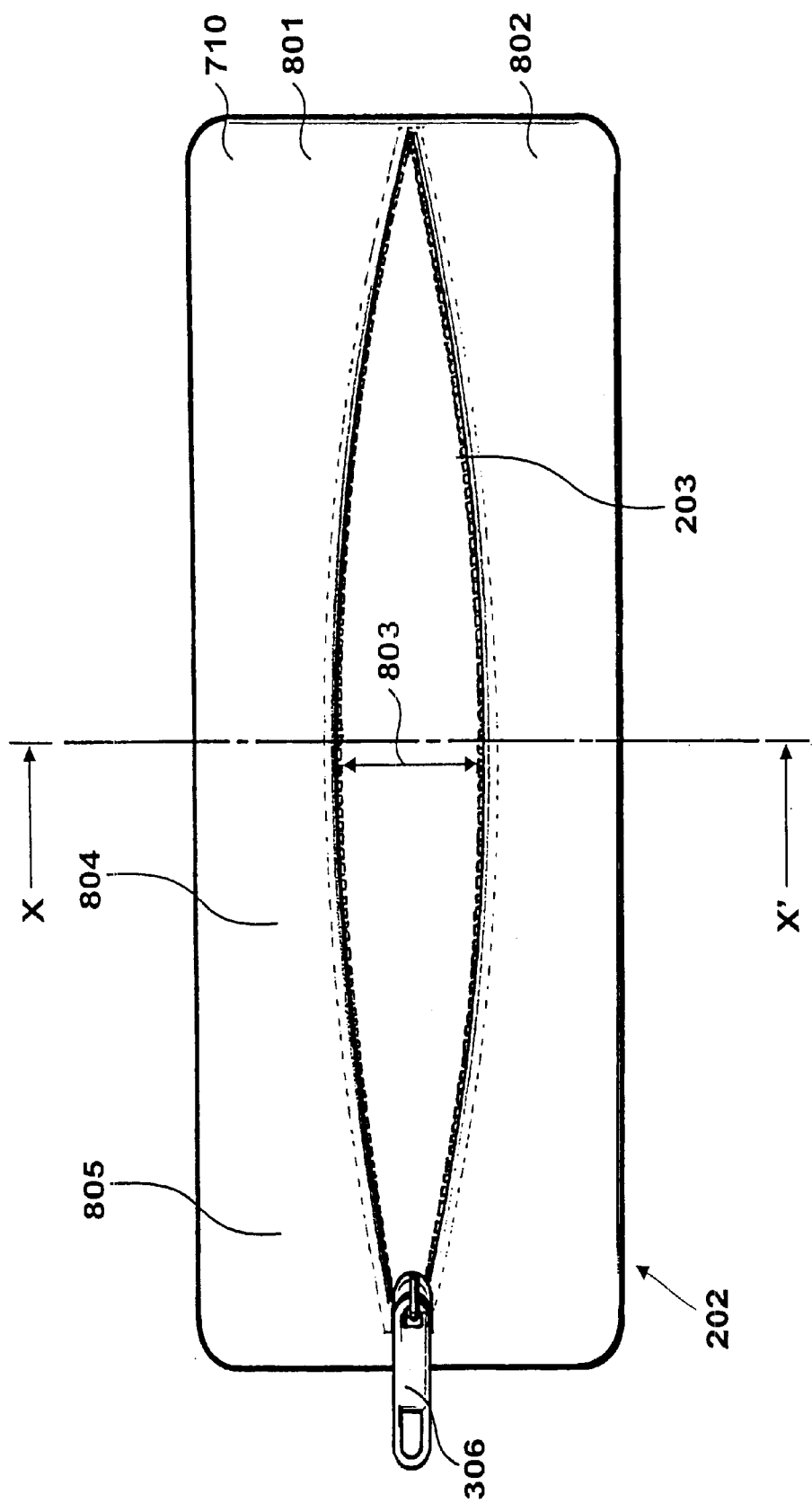
FIG. 8A is a plan view of the underside of the keyboard 202 in the first flexible operational configuration.

A plan view of the underneath surface of an assembled fabric keyboard in the first flexible configuration is illustrated in FIG. 8A. As described in reference to FIG. 7, fabric layer 710 forms the lower most layer of the assembled keyboard 202. The lower most layer 710 comprises two portions, 801 and 802, that are stitched together to form fabric layer 710. A zip fastener 203 is provided between the two portions 801 and 802. In the first flexible configuration, the zip fastener 203 is in the open position with the zip fastener element 306 in a retracted position on the left hand side of the keyboard 202. The semi-flexible support layer 750 provides an inherent proportion of elastic rigidity to the keyboard 202 such that, in this configuration the zip fastener 203 is splayed apart to define an eliptical gap with a maximum separation indicated at 803. This feature is further exaggerated by fabricating the portions 801 and 802 to be narrower in width at position 804 compared to position 805.

Figure 8B:
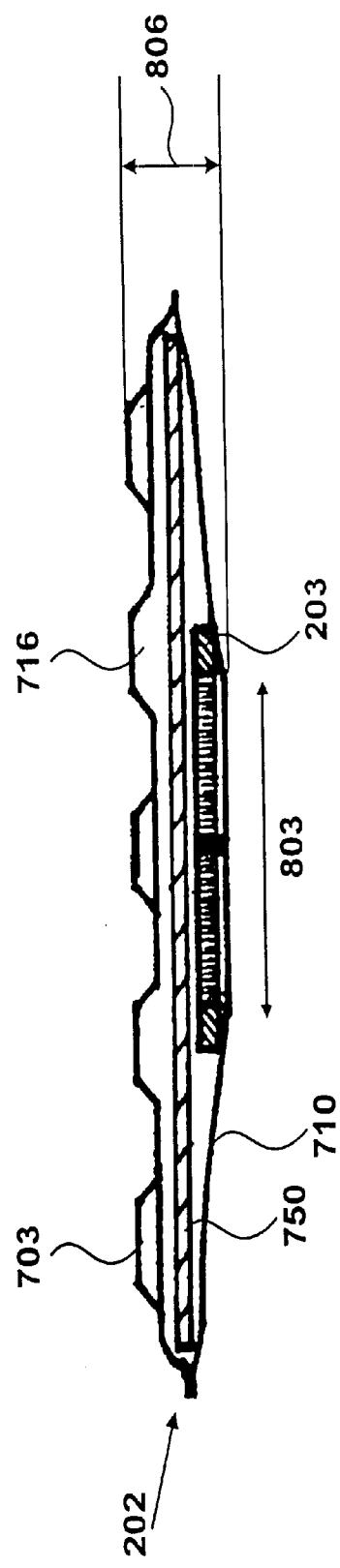
FIG. 8B is a cross sectional view of keyboard 202 taken along line X–X' of FIG. 8A.

FIGS. 8A and 8B

FIG. 8B is a cross-sectional view taken along line X–X' of FIG. 8A. For clarity of illustration, only the upper fabric layer 703, the support layer 750 and the lower most fabric layer 710 are shown in FIG. 8B. The uppermost fabric layer 703 is formed to the shape of the key registration device protrusions of layer 704 (not shown) and the support layer 750 is in the flat planar configuration as shown in FIG. 7. The fabric layers 701 to 702 and 704 to 709 are sandwiched in between the upper surface of the support layer 750 and the uppermost fabric layer 703. The lower most fabric layer 710 is also shown with portions 801 and 802 separated by gap 803 formed in zip fastener 203. The keyboard 202 is substantially flat in this embodiment with a small maximum beam thickness as indicated by arrow 806.

FIG. 9A

Figure 9A:
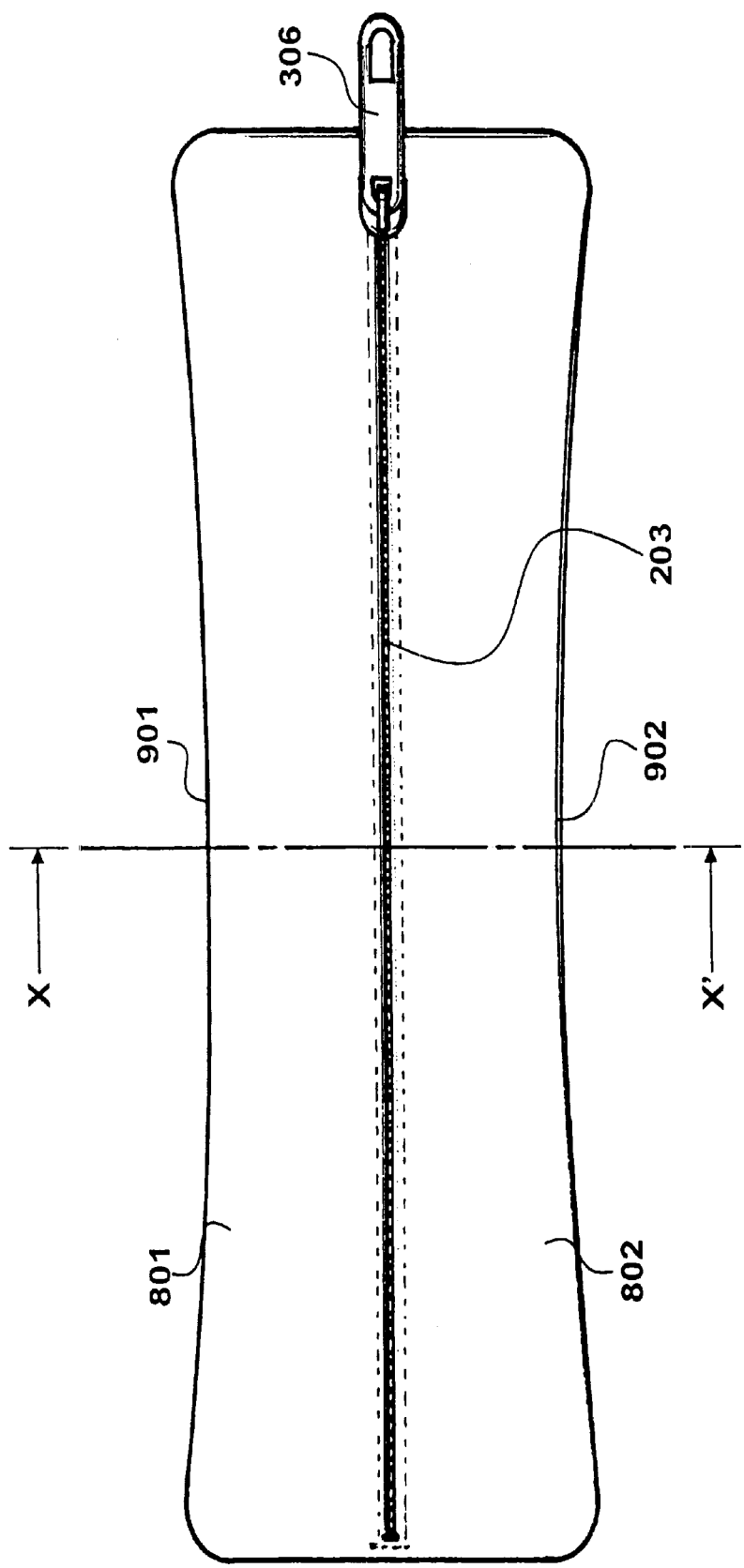
FIG. 9A is a plan view of the underside of keyboard 202 in the second rigid operational configuration.

In situations where an operator wishes to use the fabric keyboard 202 in a rigid configuration the keyboard 202 is reconfigured to a second rigid configuration. A plan view of the underneath surface of an assembled fabric keyboard 202 in the second rigid configuration is illustrated in FIG. 9A. The keyboard 202 has been reconfigured to this second configuration by drawing the retracted zip fastener element 306 from the left hand side of the keyboard 202 shown in FIG. 8A to the right hand side of the keyboard as shown in FIG. 9A, thereby closing the zip fastener 203. As the zip fastener element 306 is drawn across the lower surface of the fabric keyboard, the stretch resistant Rip Stop fabric of layer 710 draws in the bottom and top edges 901 and 902 of the fabric keyboard. This effect is greatest at the positions of where the gap between the portion of zip fastener 203 is greatest in the open configuration as shown at 803 in FIG. 8A. In alternative embodiments, alternative means such as laces are used in the place of zip fastener 203. The effect of closing the zip fastener on the cross-sectional profile of the keyboard 202 is shown in FIG. 9B.

FIGS. 9B

Figure 9B:
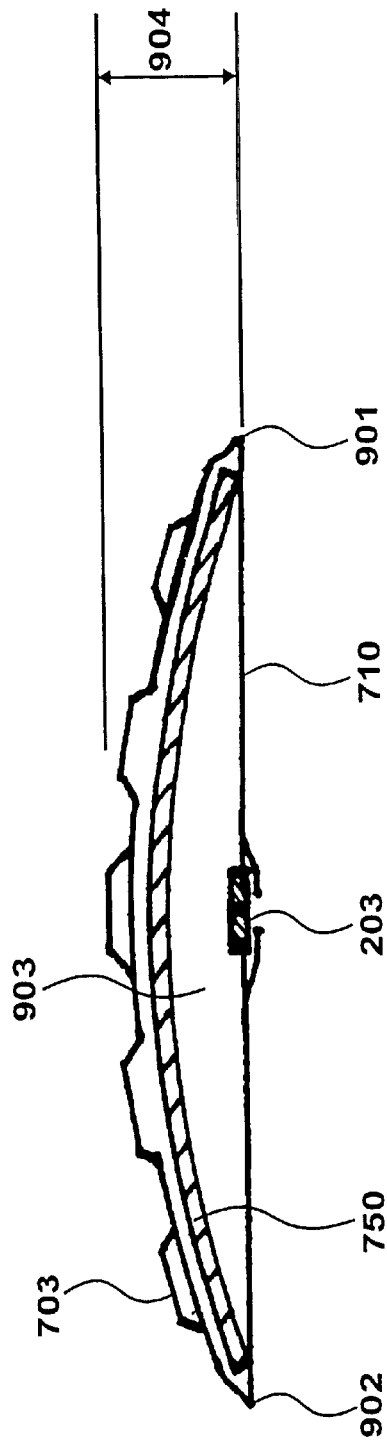
FIG. 9B is a cross sectional view taken along line X to X' of FIG. 9A.

FIG. 9B is a cross-sectional view taken along line X–X' of FIG. 9A. For clarity of illustration, only the upper fabric layer 703, the support layer 750 and the lower most fabric layer 710 are shown in FIG. 9B. In the second rigid configuration, zip fastener 203 is closed causing the stretch resistant lower fabric layer 710 to draw in the bottom and top edges 901 and 902 as previously described. The pressure produced by drawing in the bottom and top edges 901 and 902 causes the support layer 750 to deform into an arched configuration. The support layer 750, in this arched configuration, is placed under elastic tension which inhibits the folding of the keyboard 202 about any axis and provides a rigid surface to enable an operator to interact with the keyboard surface without causing any bending or flexing of the keyboard under normal finger pressures.

The deformation of the support layer 750 forces the upper fabric layer 703 and fabric layers 701 to 702 and 704 to 709 (not shown) to distend upwards. It is for this reason that all the fabric layers positioned above the support layer 750 have a degree of elasticity to allow a degree of extension and shear movement between the respective layers. The distension of the support layer 750 provides a resultant increase in the maximum beam thickness shown at 904. This beam thickness is greater than the maximum beam thickness shown at 806 in FIG. 8B. The second rigid configuration is therefore associated with a greater maximum beam thickness than that which occurs in the first flexible configuration.

FIG. 10

Figure 10:
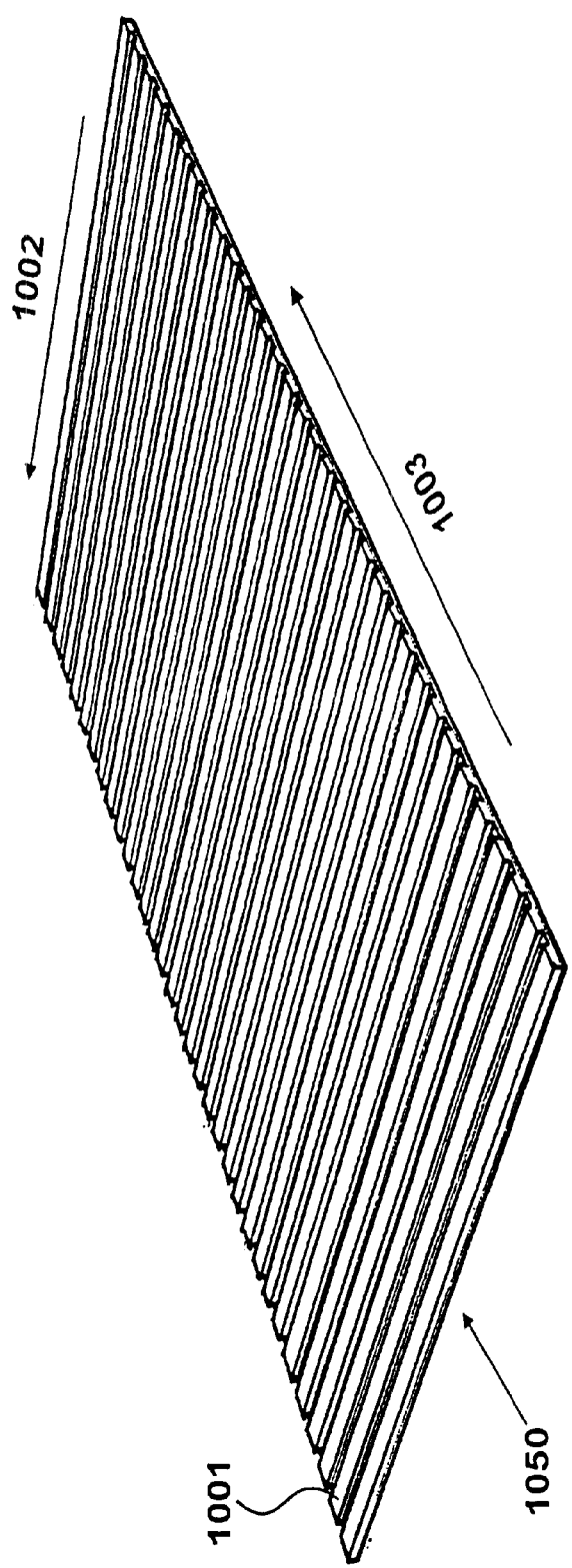
FIG. 10 is a perspective view of an alternative embodiment of a support layer in the first flexible operational configuration.

An alternative embodiment of the support layer 750 of the present invention is shown in FIG. 10 in the first flexible configuration. This support layer 1050 may be substituted for the support layer 750 as shown in FIG. 7, 8A, 8B, 9A and 9B. Support layer 1050 is a one millimeter thick sheet of polyurethane having a Shore Hardness of approximately eighty Shore A and parallel corrugations 1001 extending across the width of the support layer 1050 parallel to the direction of arrow 1002. Therefore, support sheet is essentially the same as support sheet 750 with the addition of parallel corrugations. The purpose of the corrugations 1001 is to assist the ease with which the semi-flexible support layer 1050 may be folded about axes parallel to arrow 1002 in the first flexible operational configuration.

FIG. 11

Figure 11:
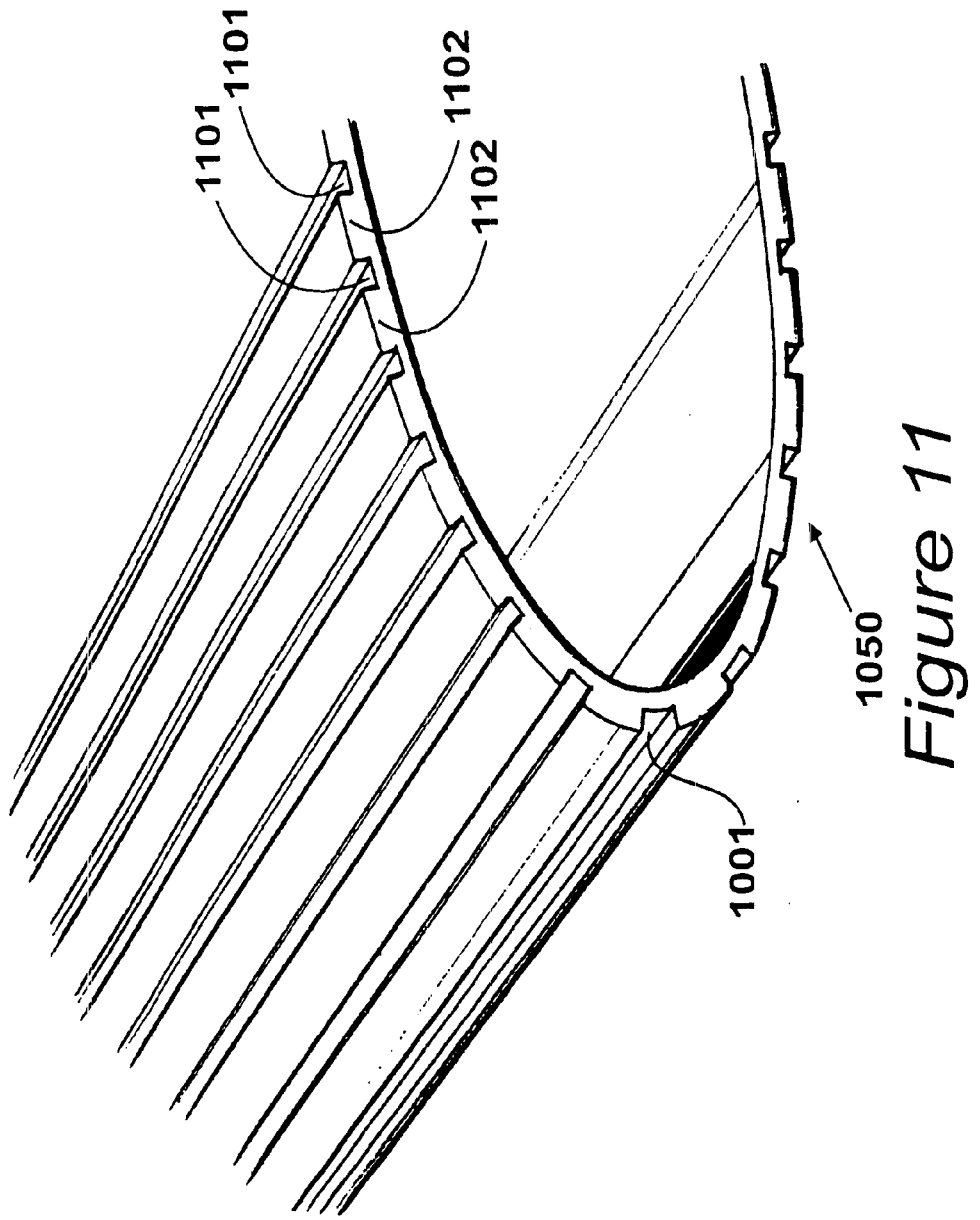
FIG. 11 shows the support layer shown in FIG. 10 bending about a first axis in the flexible configuration.

A perspective view of FIG. 11 bent about a first axis parallel to arrow 1002 of FIG. 10 is shown in FIG. 11. Bends such as that illustrated are required to enable the device to be wrapped around the electronic processor 201 as shown by bend portions 204 and 205 of FIG. 2. For this reason, it is necessary that the corrugations 1001 extend in a direction parallel to the axis about which the keyboard 202 is to bend during these wrapping operations (the first axis). In FIG. 11, the support sheet is bent about a first axis with corrugations 1001 on the outer surface of the bend. The corrugations define thick portions 1102 with thin portions 1101 interposed between the thick portions. The thin portion 1101 provide less resistance to the formation of bends and therefore, require less manual force to enable a bend to be formed. The support sheet 1050 would, however, have increased resistance to bends formed about a longitudinal axis parallel to the direction of arrow 1003 shown in FIG. 10.

FIGS. 10 and 11 show the support sheet 1050 in a first flexible configuration equivalent to the configuration of support sheet 750 shown in FIGS. 8A and 8B. The support sheet may be reconfigured to a second rigid configuration as shown for sheet 750 in FIGS. 9A and 9B. When support sheet 1050 is displaced into an arched configuration as shown for sheet 750 in FIG. 9B, the elastic tension formed in the support sheet 1050 provides a rigid support surface sufficient to enable an operator to use the keyboard and inhibits the flexing or bending of the keyboard about any axis. The advantage of the support sheet 1050 is the ease with which the sheet may bend about an axis parallel to the formed corrugations that reduces the manual effort required to bend the support layer 1050 (and hence the fabric keyboard 202) in to a wrapped up configuration.

In a preferred manufacturing process the support sheet 1050 is prepared by a moulding process. In an alternative embodiment, the support sheet 1050 is prepared by an extrusion process.

In a further alternative embodiment, support layer 1050 is a sheet of polypropylene.

FIG. 12

Figure 12:
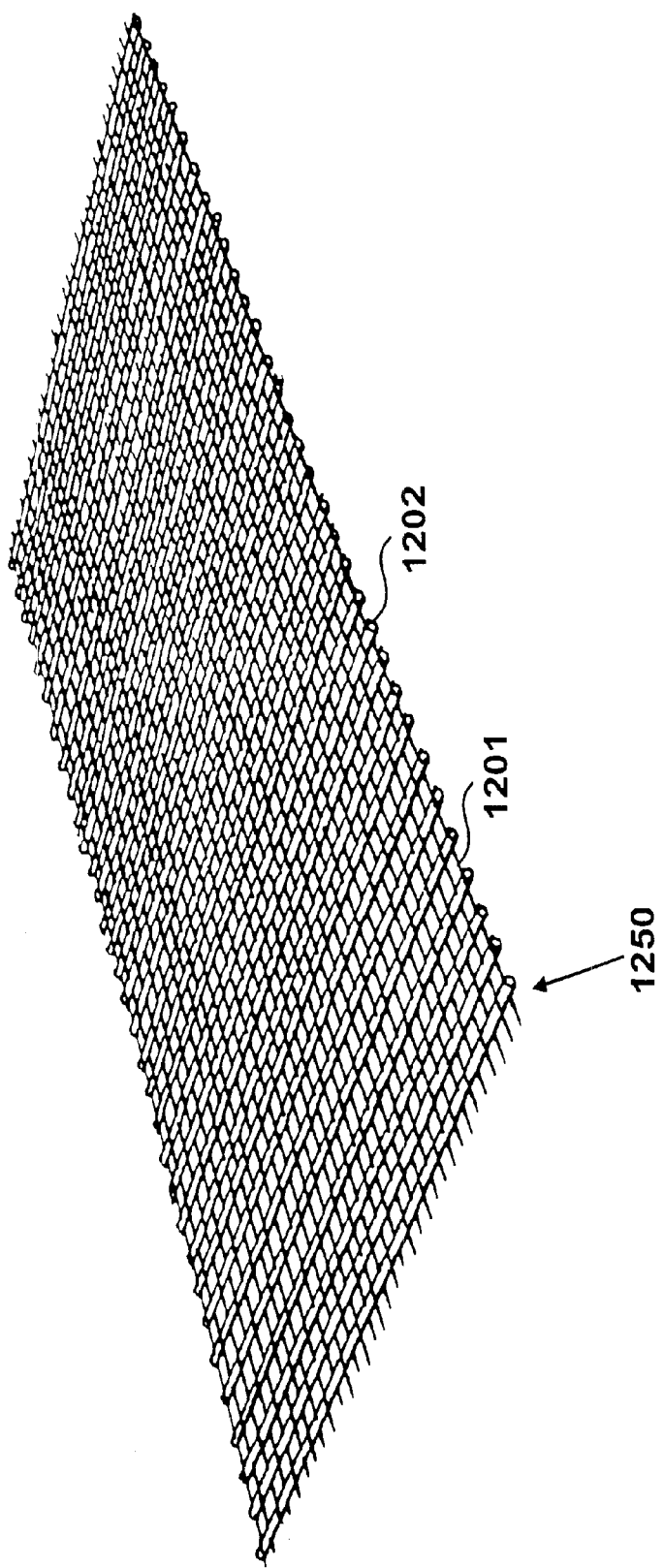
FIG. 12 shows a further alternative embodiment of a support layer in the first flexible operational configuration.

FIG. 12 is perspective view of a further alternative embodiment of a support layer in a first flexible operational configuration that may substituted for support layer 750 of FIG. 7. In this embodiment support layer 1250 is partly composed of polyester fabric fibres 1201 which extend in a weft direction and partly composed of hard nylon rods 1202 that extend in the warp direction. The hard nylon rods are preferably 0.7 millimeter diameter hard nylon monofilaments which are semi-flexible relative to the flexible fabric weft fibres. The fabric fibres 1201 are soft and flexible conventional textile fibres in the form of multi-filament yarns of polyester having a smaller diameter than the warp nylon rods 1202.

The fabric support layer 1250 is analogous to a material used in the conventional textile industry to provide support to portions of garments in a process known as 'Whale boning'.

In an alternative embodiment, fabric fibres 1201 are mono-filament polyester yarns.

FIG. 13

Figure 13:
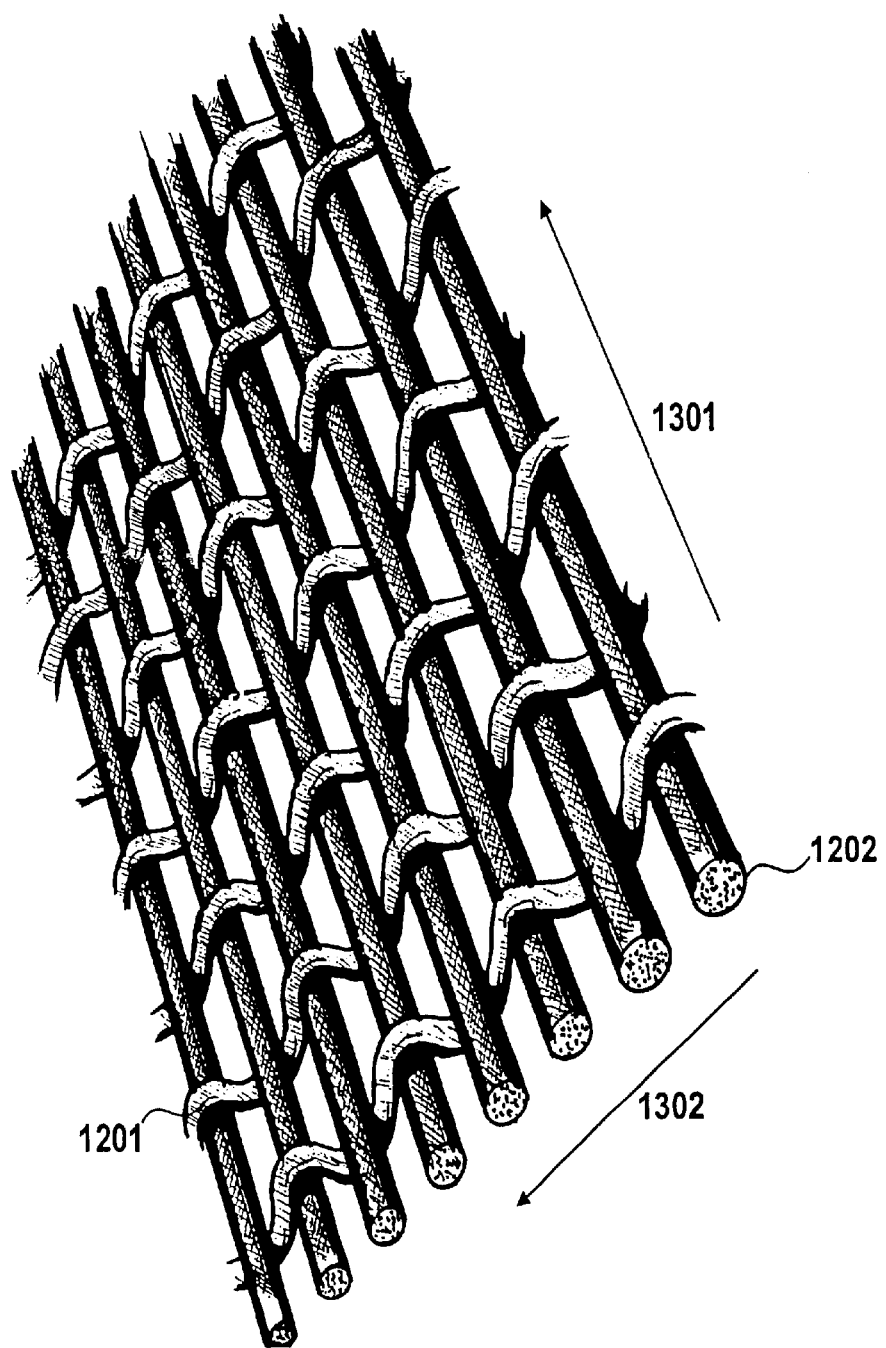
FIG. 13 shows a magnified view of a portion of a the support layer 1250 shown in FIG. 12.

A portion of support layer 1250 is shown in greater detail in FIG. 13. For the purpose of clarity of illustration only, the warp and weft fibres of support layer 1250 are shown in FIG. 13 more widely spaced than would usually be the case in practice. The warp nylon rods 1202 are shown disposed in a planar and parallel arrangement with respect to one another and bound together by the weft fabric fibres 1201 under tension so as to provide a tight cohesive assembly of parallel warp nylon rod fibres 1202. The support sheet 1250 is configured in a similar manner to support sheet 1050, to facilitate a greater ease of bending about an axis parallel to arrow 1301, whilst providing greater resistance to bending about axes parallel to arrow 1302 in the first flexible configuration. It is therefore important to align the warp rod fibres 1202 so as to be parallel with the desired axis of bending which, in this embodiment, is parallel to the arrow 1301 to enable the support layer 1250 (and hence the keyboard 202) to be wrapped around the electronic processor with bends 204 and 205 as shown in FIG. 2.

Figure 14A:
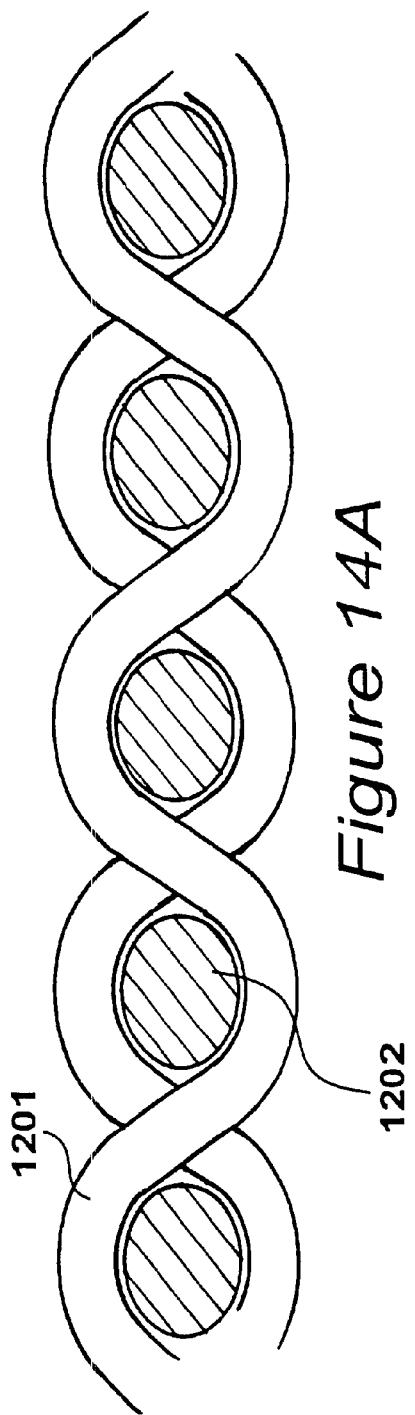
FIG. 14A is an end view of the support layer shown in FIG. 12.
Figure 14B:
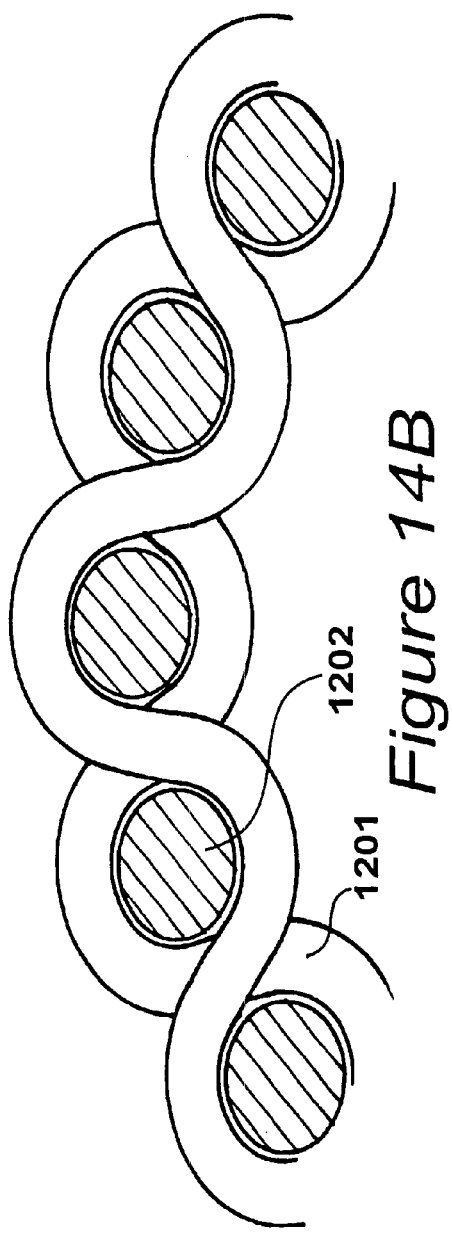
FIG. 14B is a further end view of the support layer shown in FIG. 14A in which the support layer is bending about a first axis.

FIGS. 14A and 14B

An end view in the direction of arrow 1301 of the support layer 1250 is shown in FIG. 14A. The warp nylon rods 1202 are shown separated by the interwoven weft fabric fibres 1201. At the position of a bend the warp nylon rods 1202 are displaced from a common plane as shown in FIG. 14A and the elasticity of the weft fabric fibres facilitates this displacement to form a bend as shown in FIG. 14B. Therefore, when bending about a first axis parallel to arrow 1301 of FIG. 13, no force is required to bend the semi-flexible nylon rods 1202 and consequently, the formation of bend about such a first axis does not require undue mechanical force. To bend about any other axis that is not parallel with arrow 1301 would require the bending or flexing of warp nylon rods 1202 and hence, would require greater manual force. It is therefore not possible to bend the support layer 1250 about a tight radius about axes that are not parallel to the direction of the arrow 1301.

FIGS. 12 to 14 show the support layer 1250 in a first flexible operational configuration in which the layer is able to bend about a first axis. The support layer may be reconfigured to a second rigid configuration by displacing the support layer 1250 to an arched configuration in which the hard nylon warp fibres 1202 are bent to form an arched profile similar to that shown for support sheet 750 in FIG. 9B. In this second rigid configuration, elastic tension formed in the hard nylon warp fibres prevents bending or flexing of the support layer (and hence the fabric keyboard 202) about any axis including the first axis as shown in FIGS. 14A and 14B.

FIG. 15

Figure 15:
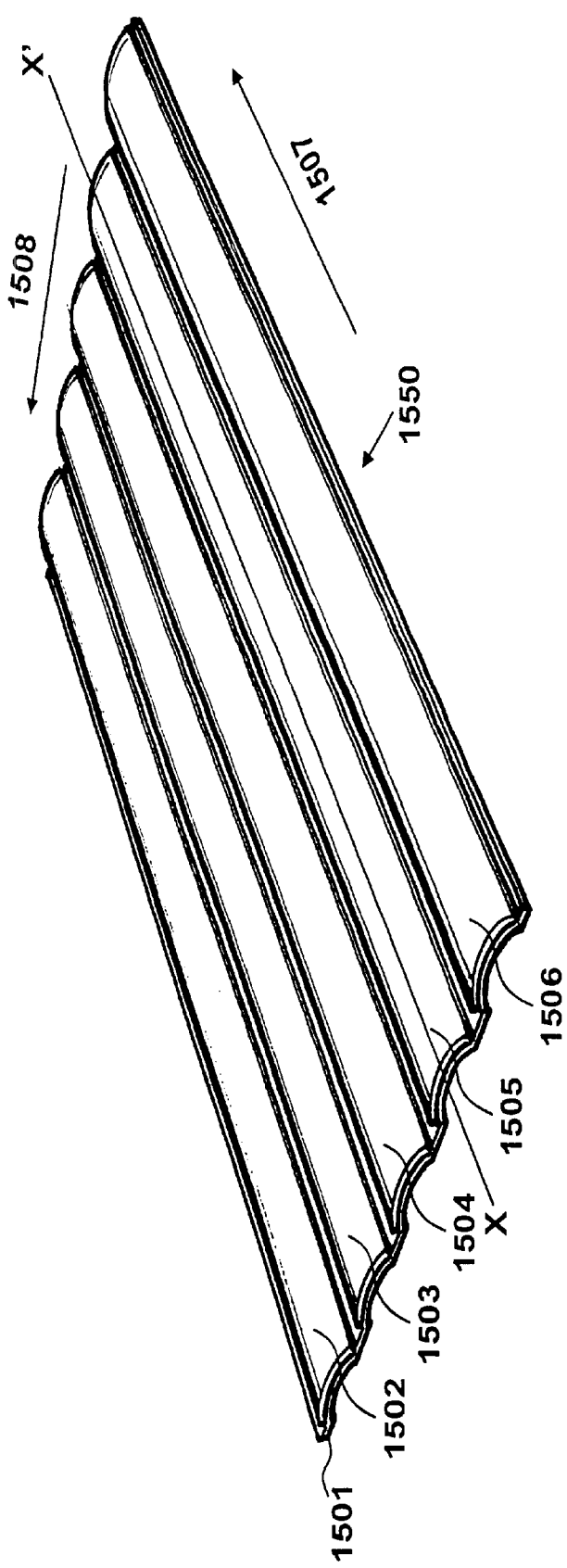
FIG. 15 is a perspective view of an alternative embodiment of a support layer in a second rigid configuration.

FIG. 15 shows an alternative embodiment of a support layer in a second rigid configuration. The support layer of the present embodiment 1550 may be substituted for the layer 750 shown in FIG. 7. In contrast to the previously described support layer embodiments 750, 1050 and 1250, the support layer 1550 comprises a series of elongate support portions 1502 to 1506 mounted onto a fabric sheet 1501. The fabric sheet 1501 is a standard flexible fabric sheet comprising multi-filament polyester yarns. The support portions 1502 to 1506 are lengths of sprung steel that are attached to the fabric layer 1501 by means of a suitable adhesive. The support portions 1502 to 1506 are elongate arched strips which provide each of portions 1502 to 1506 with inherent rigidity. In this embodiment, there are five support portions arranged so as to provide support across the five horizontal rows of keys provided on the keyboard surface (see FIG. 4). For example, support portion 1502 provides support to the upper horizontal row of keys and support portion 1506 provides support to the bottom horizontal row of keys. Therefore, as each horizontal row of keys is provided with a corresponding support portion, these support portions provide sufficient structural support to the keyboard 202 to enable the depression of key registration devices on the keyboard surface whilst the keyboard resides on an uneven support surface without undue bending or flexing of the keyboard inhibiting effective use.

In an alternative embodiment, the support portions 1502 to 1506 are moulded strips of polyurethane having a Shore Hardness of approximately eighty Shore A.

The support portions 1502 to 1506 provide rigidity against flexing or bending along their respective lengths. However, the keyboard may be flexed at positions between the support portions 1502 to 1506 about axis parallel to the direction of the arrow 1507. Although a degree of flexing is facilitated between the respective support portions 1502 to 1506, a greater resistance to bending about a first axis parallel to the direction of the arrow 1508 is provided by the support portions in the second rigid configuration, in a similar manner to the previously described support layers 750, 1050 and 1250. Accordingly, longitudinal rigidity is provided in the second rigid configuration across the length of support layer 1550.

The support layer 1550 differs from the previously described embodiments of the support layer in that the support portions of support layer 1550 are fabricated in the second rigid configuration and there is no requirement to distend the support layer 1550 as a whole into the an arched configuration as is required for the previously described embodiments. Therefore, the zip fastener arrangement 203 described in FIGS. 7, 8A, 8B, 9A, and 9B is not required for the reconfiguration of support layer 1550 to a second rigid configuration. Consequently, the layer 710 illustrated in FIG. 7 may be replaced by a continuous durable fabric sheet that forms the under surface of the keyboard 202. It is an advantage of the support layer 1550 that the provision of separate support portions enables the support layer as a whole to remain substantially flat whilst in the second rigid configuration. This presents the operator of the keyboard with a rigid keyboard surface that remains substantially flat (i.e. it does not arch). It will be apparent from FIG. 9B that the previously described embodiments of the support layer 750, 1050 and 1250, provide a rigid configuration of the keyboard with a curved upper surface.

In addition to providing rigidity to the keyboard in the second rigid configuration, the support portions 1502 to 1506 also provide tactile feedback to the operator of the keyboard by providing resistance to the mechanical interaction of the operator's finger when pressing a key until local collapsing of the arched profile occurs to enable an operator to sense that the key has been pressed with sufficient force to register a data entry. In an alternative embodiment, the support layer 1550 is substituted for the layer 704 shown in FIG. 7 so that the elongate support portions 1502 to 1506, in addition to providing rigidity, also serve as key registration devices. In this embodiment, located along the underneath surface of each of the support portions 1502 to 1506 are downward facing protrusions which correspond to specific keys identified on the uppermost layer 703. Therefore, the depression of a key such as a spacebar causes a limited deformation of the support portion with the protrusion on the underside forcing the electrically conductive layers 701, 707 and 702 into close proximity. The position of this mechanical interaction may then be determined and correlated with the data input corresponding to the depression of the spacebar key.

FIG. 16

Figure 16:
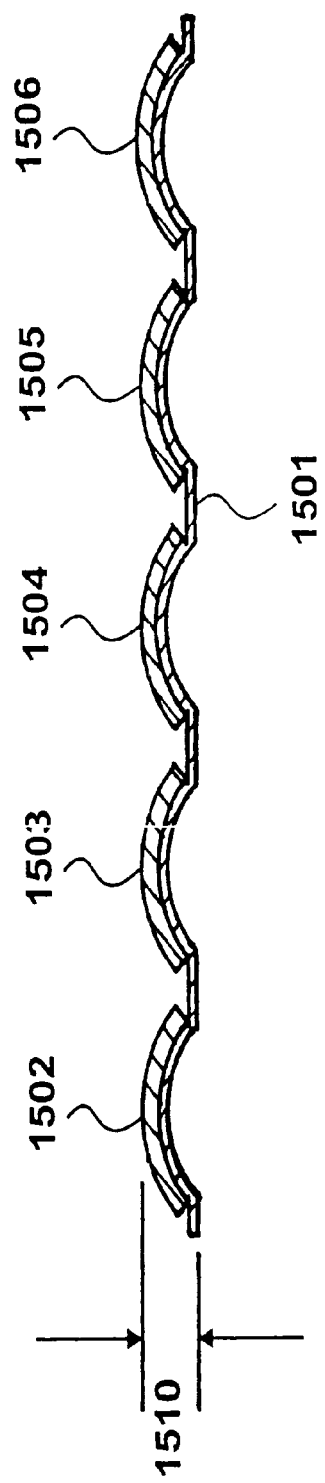
FIG. 16 is an end view of the support layer shown in FIG. 15.

FIG. 16 is an end view of the support layer 1550 in the second rigid configuration illustrating the support portions 1502 to 1506 mounted onto the fabric layer 1501. As previously indicated, each of these portions 1502 to 1506 is fabricated with an arched cross-sectional profile so as to provide a rigidity to these portions. Accordingly, each support portion provides a maximum beam thickness as indicated at 1510. It should be noted that, as support layer 1550 comprises a series of support portions, the maximum beam thickness 1510 is not required to be as large as that indicated for the previously described embodiments in FIG. 9B at 904.

FIG. 17A

Figure 17:
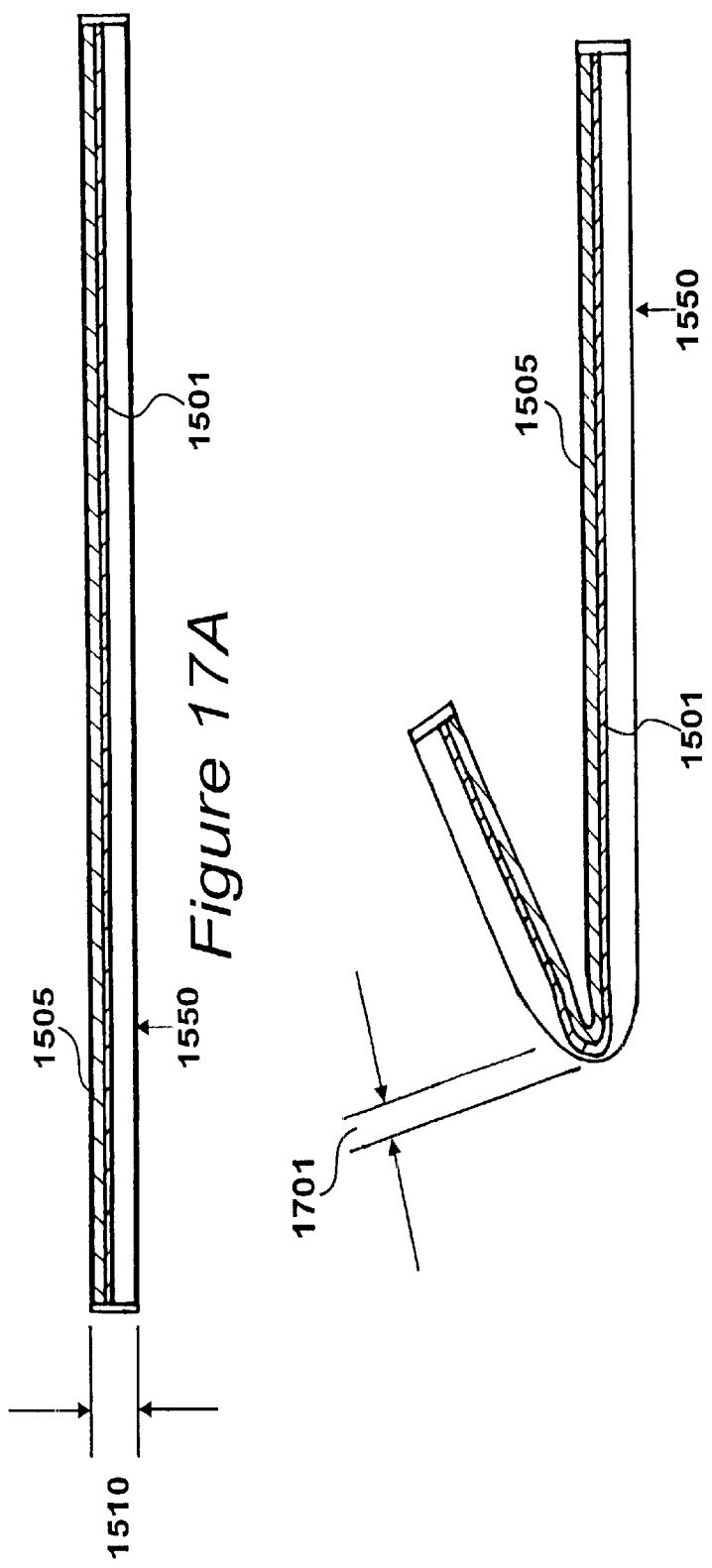
FIG. 17A is a cross-sectional view taken along line X to X' of the support layer 1550 shown in FIG. 15.
FIG. 17B is a further cross sectional view showing the support layer of FIG. 14 bending about a first axis.

A cross sectional view taken along line X to X' of FIG. 15 is shown in FIG. 17A. This cross sectional view dissects the support portion 1505 with the associated fabric layer 1501 contacting the underneath surface of support portion 1505. As described in reference to FIG. 16, in the second rigid configuration the support layer 1550 has a maximum beam thickness as indicated at 1510.

FIG. 17B

In order to facilitate the bending of the support layer 1550 about a first axis parallel to the arrow 1508 shown in FIG. 15 to enable the keyboard 202 to be wrapped up, it is necessary to reconfigure an area of the support portion 1505 from the second rigid configuration to a first flexible configuration as shown in FIG. 17B. To enable the support layer 1550 to bend it is first necessary to flatten the arched profile of the support portions thereby reducing the beam thickness of the support portion as shown at 1701 in FIG. 17B. At the position of reduced beam thickness the support layer 1550 easily bends about a first axis. Therefore, an area of the support portion 1505 shown in FIG. 17B is reconfigured from the second rigid configuration in which bending about the first axis is inhibited to a first flexible configuration in which the bending about a first axis may occur. The reconfiguration of an area of the support portions to the first flexible configuration facilitates the wrapping of the keyboard 202 comprising the support layer 1550 around an electronic processor device 201 as illustrated in FIG. 2.

A suitable means to reconfigure an area of the support portions 1502 to 1506 to the first flexible configuration to facilitate such bending is required. In a first embodiment, this is achieved by simple mechanical force (similar to that required to bend a sprung steel tape measure) which exceeds the force required during normal operation of the keyboard. In a second embodiment, the electronic processor may be provided with a lip protrusion along the left and right hand side edges about which the fabric keyboard 202 bends to form the wrapped configuration. Therefore, when the electronic processor 201 is placed on the keyboard 202 for reconfiguration into the wrapped up configuration the lip protrusions force the arched profiles of the support portions from the second rigid configuration to the first flexible configuration along the edges of the electronic processor facilitating the bending of the keyboard 202 about a first axis to wrap the keyboard around the electronic processor device.

FIG. 18

Figure 18:
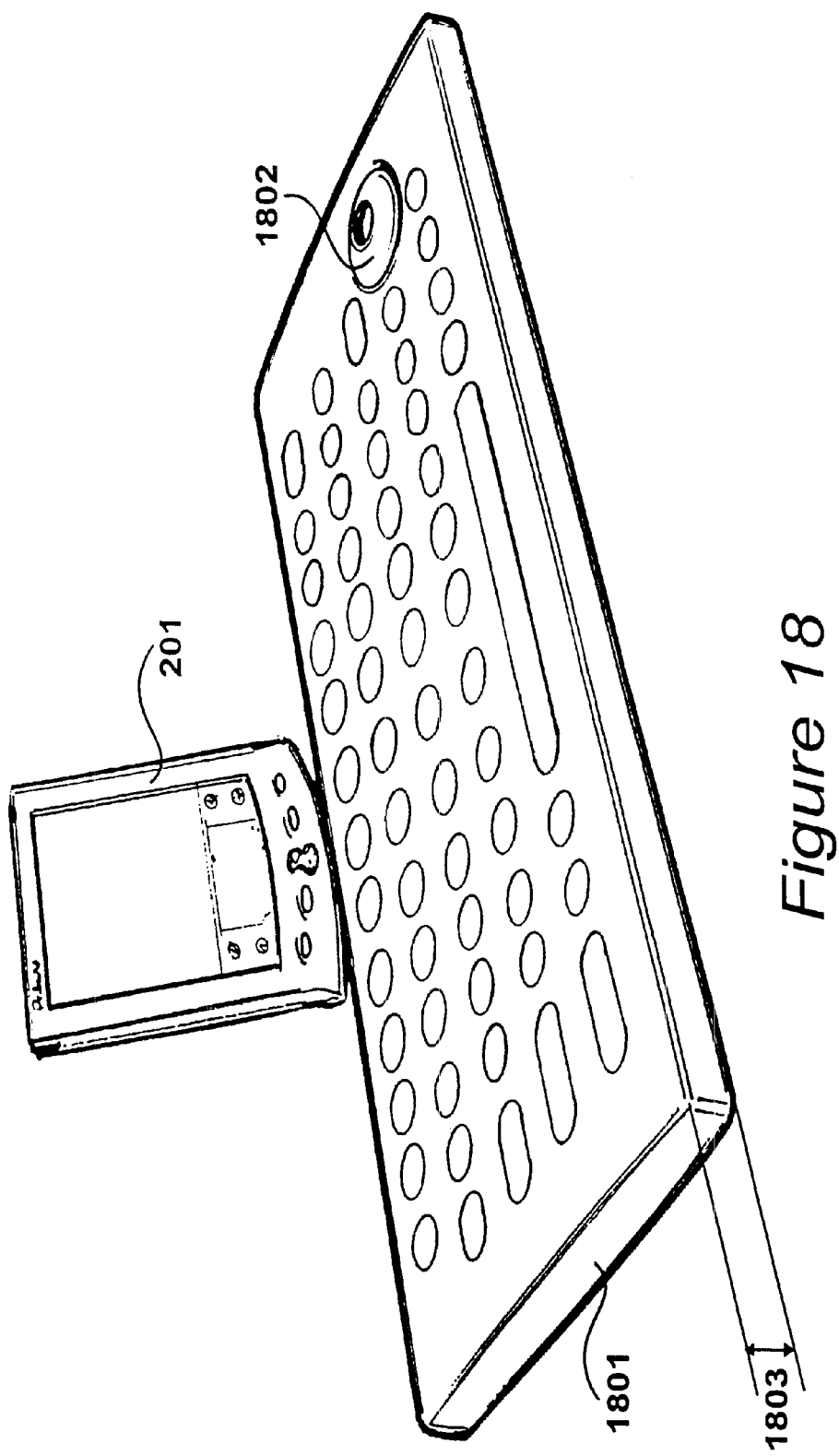
FIG. 18 is a perspective view of an alternative embodiment of a data input device.

A further alternative embodiment of the keyboard 202 is shown in a second rigid configuration in FIG. 18. In this embodiment the keyboard 1801 comprises a plurality of key registration devices on its upper surface in addition to a pump 1802 which serves to inflate an airtight compartment located within the keyboard 1801. The keyboard 1801 therefore has a first flexible configuration wherein the keyboard is deflated and may be folded about an axis so as to wrap around the hand held electronic processor device 201. In addition, the keyboard 1801 may be inflated using the finger pump 1802 to provide a second rigid configuration wherein the bending of the device about any axis is inhibited and there is a corresponding increase in the beam thickness of the keyboard 1801 as shown at 1803.

In an alternative embodiment the finger pump 1802 is replaced by a mouth-piece valve, equivalent to the valves found on flotation aids such as arm bands and rubber rings, through which an operator directly inflates the keyboard 1801 to reconfigure the keyboard from the first flexible configuration to the second rigid configuration. Furthermore, the keyboard 1801 may be returned to the flexible configuration by releasing the air from the keyboard by squeezing the sides of the mouth-piece valve between the fingers.

FIG. 19

Figure 19:
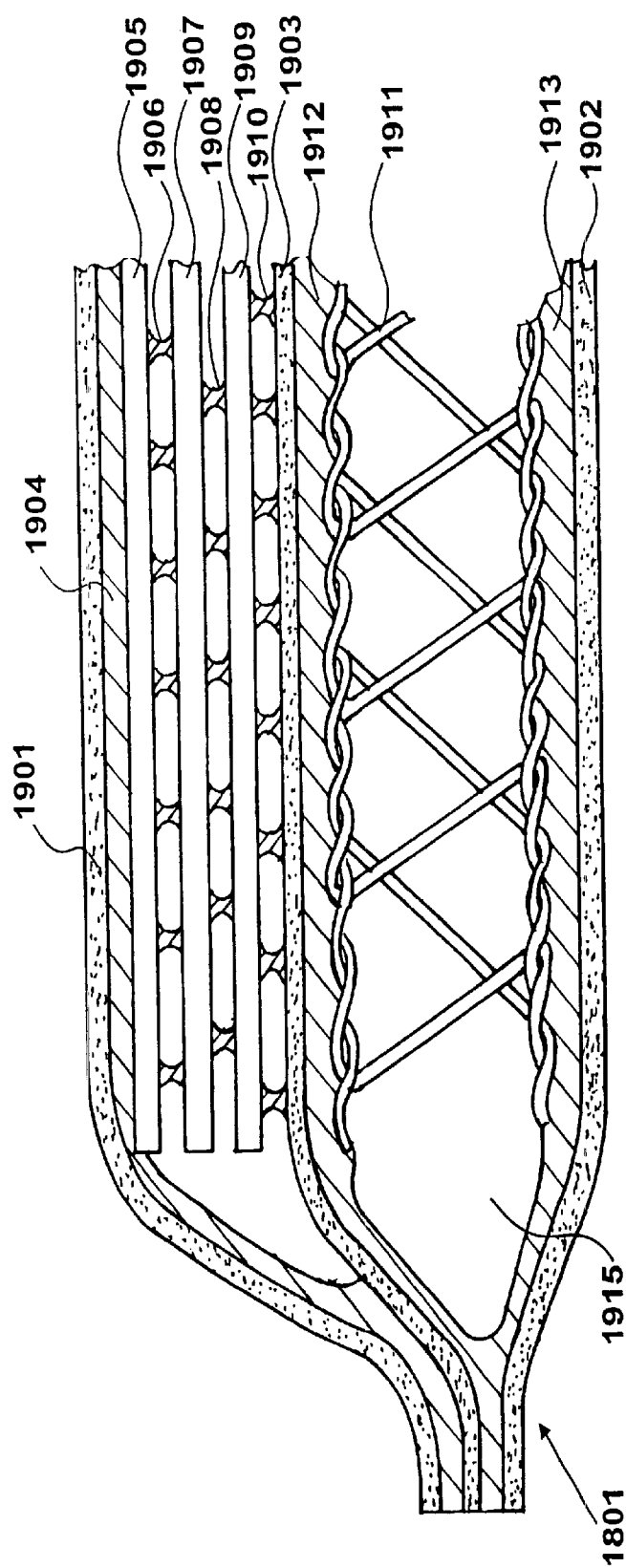
FIG. 19 is a cross-sectional view of a portion of the data input device shown in FIG. 18.

FIG. 19 shows a cross section of a portion of the keyboard 1801 shown in FIG. 18. The keyboard includes a first outer polyurethane covered nylon layer 1901 with a similar layer, layer 1902, at its bottom surface. In addition, there is provided a similar polyurethane covered nylon intermediate layer 1903. The lower surface of layer 1901 is provided with a layer of adhesive 1904 that in turn contacts a first conductive layer 1905. The first conductive layer 1905 is in contact with regions of adhesive 1906 that in turn contact an intermediate conductive layer 1907. Below layer 1907, there is a further layer of adhesive regions 1908 that connect layer 1907 to a second conductive layer 1909. The second conductive layer 1909 is secured to the intermediate nylon covered polyurethane layer 1903 by a further layer of adhesive regions 1910. In the present embodiment, the first conductive layer 1905 and the second conductive layer 1909 are identical in structure and function to the previously described first and second electrically conductive layers 701 and 702 of FIG. 7. In addition, the intermediate conductive layer 1907 is identical to the central conductive layer 707 described in reference to FIG. 7. Therefore, the determination of the position of a mechanical interaction is identical to that employed in the embodiment described in FIG. 7 which is detailed in FIGS. 21 to 27.

Spacer fabric 1911 is provided between the nylon layers 1902 and 1903, and secured to said layers by means of an adhesive 1912 and 1913. Thus, the spacer fabric 1911 is effectively contained within an airtight compartment 1915, the size of which varies dependent upon the amount of air pressurised into this compartment by operation of the finger pump 1802. As shown in FIG. 19, threads of the spacer fabric 1911 are shown in their fully extended position such that, under pressure, the degree of expansion is limited thereby providing a flat rigid keyboard structure while avoiding ballooning in any areas of the compartment 1915. Therefore, in the second rigid configuration the compartment 1915 is pressurised with air so as to provide a rigid keyboard with an increased beam thickness. Releasing the air pressure from the compartment 1915 causes the elastic fibres 1911 to recoil and reduce the beam thickness of the compartment 1915 thereby providing a first flexible configuration of the keyboard 1801 which may be bent about a first axis to wrap the keyboard around the electronic processor 201.

Along the edge 1916 of the keyboard the adhesive layers 1904, 1912 and 1913 provide an airtight seal between the nylon layers 1901, 1902 and 1903. However, alternatively the seal may be formed by radio frequency welding of the polyurethane coating of the nylon layers.

FIG. 20

Figure 20:
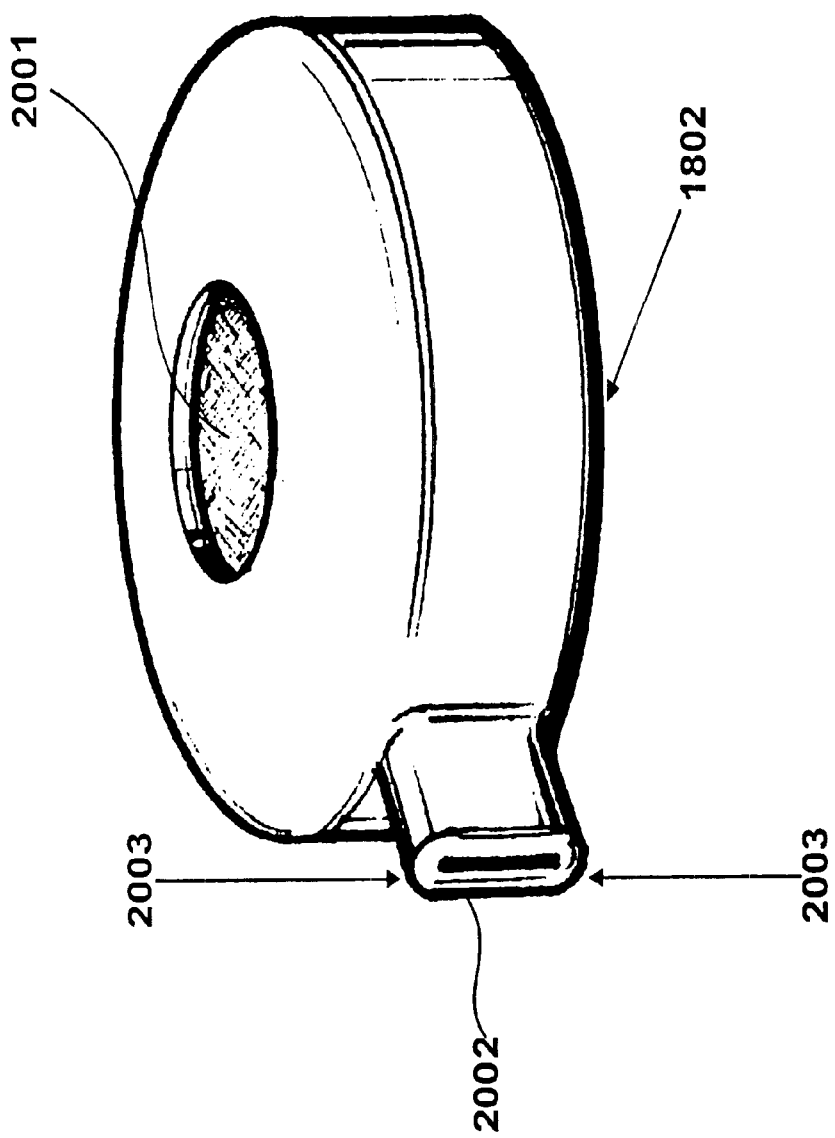
FIG. 20 is a perspective view of the finger pump incorporated into the device shown in FIG. 18.

FIG. 20 shows a perspective view of the finger pump 1802. The finger pump 1802 is constructed from soft polyurethane having a Shore Hardness of approximately fifty Shore A. An aperture 2001 is provided on the upper surface of the finger pump 1802 and is open to the upper surface of the keyboard 1801, as shown in FIG. 18. The aperture 2001 enables air to access an internal cavity of the finger pump 1802. Placing a finger over the aperture 2001 and depressing the upper surface of the finger pump 1802 causes the expulsion of air from the internal cavity into the airtight compartment 1915 of fabric layer 1911 as shown in FIG. 19 through a 'Duck-Bill' valve 2002. The Duck-Bill valve 2002 comprises an elongate aperture with retractable side walls that normally reside in a closed position and open following the compression of the finger pump to allow the expulsion of air form the internal cavity into the compartment 1915.

To release air contained within the compartment 1915 of layer 1911, pressure has to be applied to the duck bill valve 2002 in the direction of arrows 2003 as shown in FIG. 20. This opens the valve 2002 enabling air to escape from the compartment 1915 under positive pressure provided by the elastic fibres of layer 1911.

The following section will describe how a mechanical interaction on the surface of keyboard 202 is detected and the position of the mechanical interaction determined and correlated with a key press.

FIG. 21A

Figure 21A:
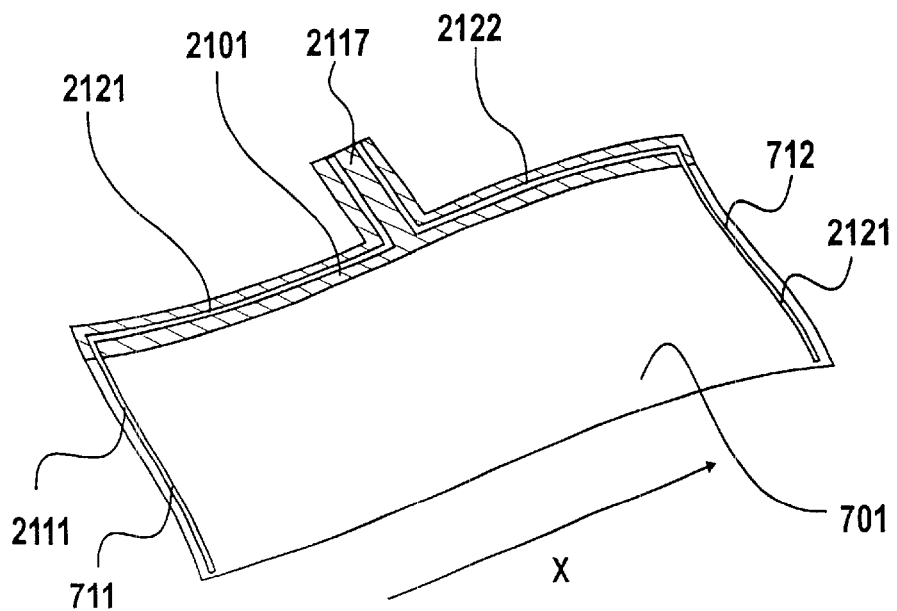
FIG. 21A details the electrically conductive fabric layer 701 shown in FIG. 7.

The first electrically conductive fabric layer 701 shown on FIG. 7, is shown in more detail in FIG. 21A. Two conductive tracks 711 and 712 form the electrical contact with the conductive fibres of fabric layer 701. A contacting portion 2111 of conductive track 711 contacts the left edge of fabric layer 701. A conduction portion 2121 of conductive track 711 is channelled into the flexible cable 2117 and prevented from contacting the electrically conductive fabric layer 701 by insulation strip 2101 that runs along the upper edge of fabric layer 901, and shown as a shaded area in FIG. 21A.

Similarly, the conductive track 712 contacts the electrically conductive fabric along the right edge of fabric layer 701 via a contacting portion 2121. A conduction portion 2122 extends into flexible cable 2117 and is prevented from contacting the electrically conductive fabric layer 701 by insulation strip 2101 that runs along the upper edge of fabric layer 701. This enables voltages to be applied between the contact portions 2111 and 2121 to provide a voltage gradient in the X-axis direction across the plane of fabric layer 701.

Figure 22:
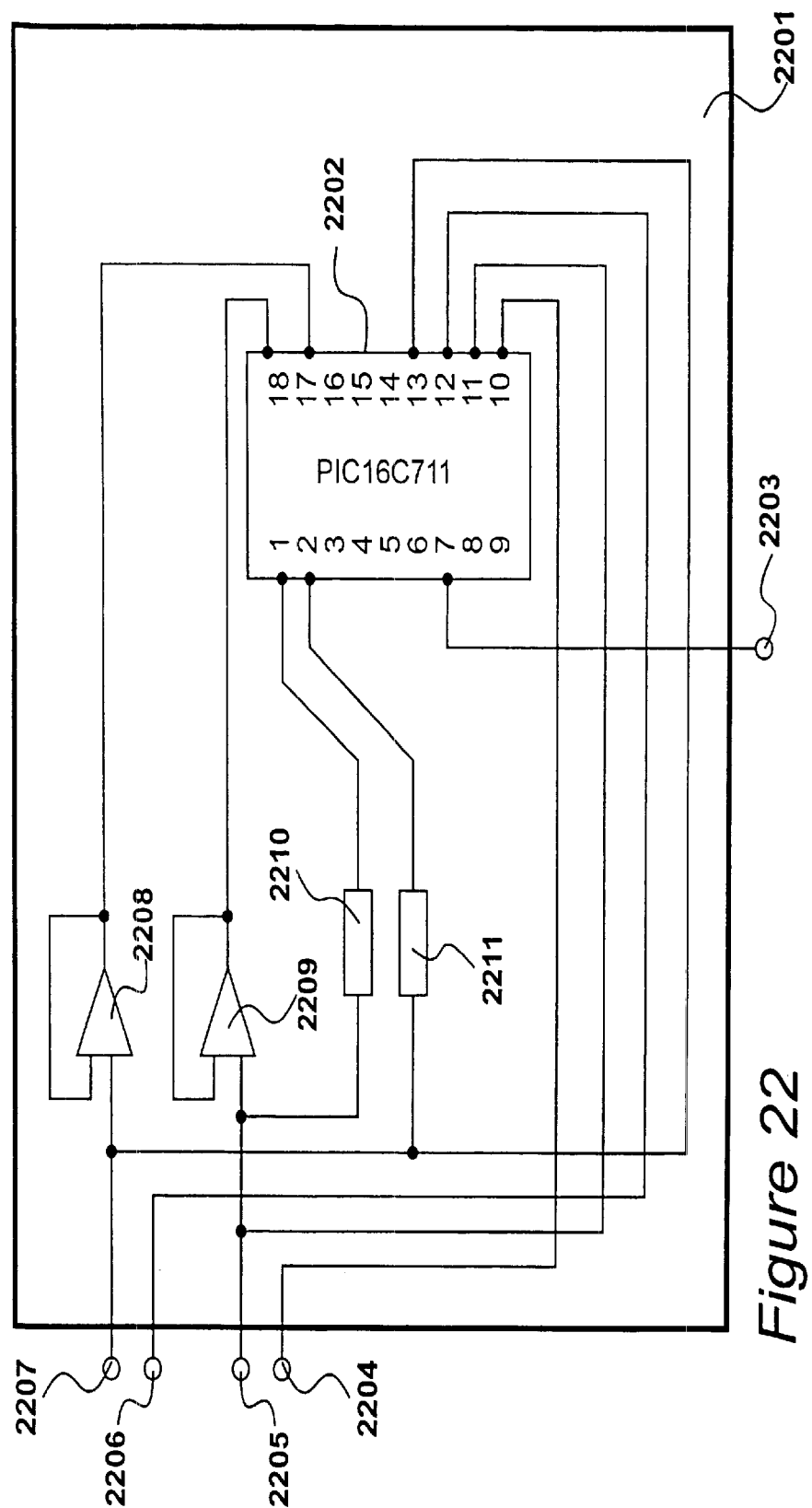
FIG. 22 shows a detailed view of the interface circuit.

The flexible cable forms a connection with the interface circuit which is to be described further in reference to FIG. 22.

FIG. 21B

Figure 21B:
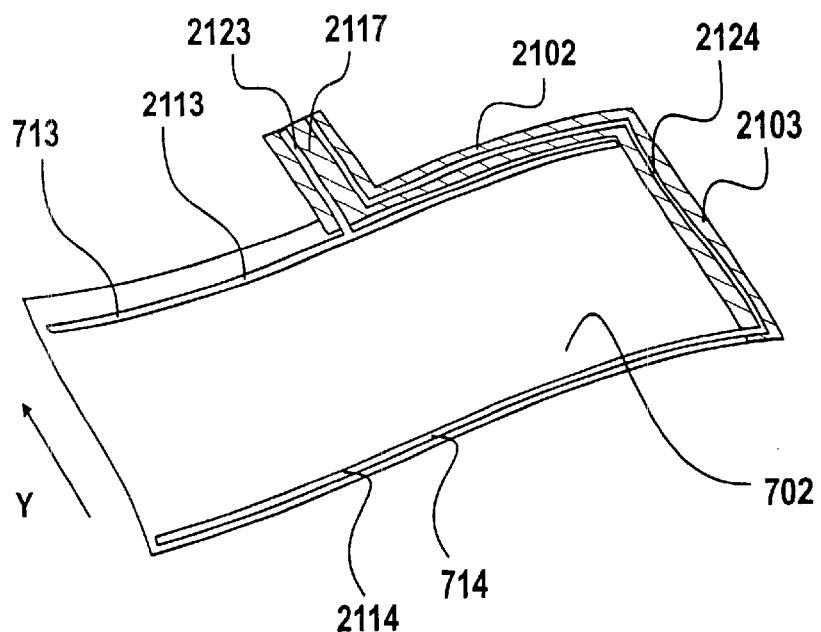
FIG. 21B details the electrically conductive fabric layer 702 shown in FIG. 7.

The second electrically conductive layer 702 is shown in more detail in FIG. 21B. Electrical connection is formed with the fabric layer 702 by the two conductive tracks 713 and 714. Conductive track 713 forms an electrical contact with the top edge of the electrically conductive fabric layer 702 via contacting portion 2113. A conduction portion 2123 of conductive track 713 extends over insulation strip 2102 that extends along the top edge of the fabric layer, and enters the flexible cable 2117. Conductive track 714 forms an electrical connection with bottom edge of the fabric sheet 702 via its contacting portion 2114. A conduction portion 2124 of conductive track 714 extends along the right edge of the fabric sheet and the top edge of the fabric sheet and enters into the flexible fabric cable 2117. The conduction portion 2124 of conductive track 714 is electrically insulated from the fabric layer by insulating strips 2102, which extends along the top edge, and 2103, which extends along the right edge, of layer 702.

Accordingly, voltages may be applied between the contact portions 2113 and 2124 of conductive tracks 713 and 714 so as to provide a voltage gradient across the electrically conductive fabric layer 702 from top to bottom in the Y-axis direction.

In this embodiment, only four connections are possible to the fabric keyboard, one connection to each of conductive tracks 711 and 712 of fabric layer 701, and one connection to each of conductive tracks 713 and 714 of fabric layer 702.

FIG. 22

The interface circuit 2201 is located in a stand assembly that supports the electronic processor 201 (not shown) and receives the conductive tracks from layers 701 and 702. The components of the interface circuit 2201 are shown in FIG. 22. The interface circuit comprises a peripheral interface controller (PIC) 2202 which is connected to a serial communication output 2203 which receives power from and transmits outputs to the serial communication port of the electronic processor 201. In addition, the PIC is connected to electrical connections 2204, 2205, 2206 and 2207 configured to supply and receive the necessary voltages to the conductive tracks 711, 712, 714 and 713 respectively. The PIC is powered by the electronic processor device which, in the case of a Palm$^{RTM}$ Vx Processor, is within the region of 3.7 to 4 volts. Four volts will be referred to hereinafter in the description.

The PIC 2202 is a programmable controller of the type PIC16C711. The PIC 2202 operates under the control of a program which controls the parameters of the keyboard which the interface circuit 2201 is configured to measure. Parameters under investigation will be discussed further in reference to FIGS. 23 to 27.

Under control of the PIC 2202, the necessary output voltages can be supplied to electrical connections 2204, 2205, 2206 and 2207 via pins one, two, ten, eleven, twelve and thirteen of the PIC. The PIC includes an analogue to digital converter which is used to process analogue voltages received at pins seventeen and eighteen. The input pins seventeen and eighteen receive outputs from high impedance buffers 2208 and 2209 respectively. The buffers 2208 and 2209 are half of unity gain operational amplifiers of the type TL062, and provide a high impedance buffer between the sensor output voltages and the PIC 2202 input ports.

Connection to pins one and two occurs via resistors 2210 and 2211 respectively. Resistors 2210 and 2211 are selected according to the resistance of the keyboard as measured from a conducting track attached to one fabric layer 701 to a conducting track attached to the second fabric layer 702 while a typical mechanical interaction pressure, i.e. a key-press is applied. A value of 10 Kohms is typical for resistors 2210 and 2211. The PIC 2202 has an external crystal oscillator (not shown) running at four MHz connected across pins fifteen and sixteen. Positive four volts is supplied to pin fourteen and ground is connected to pin five. Pin four (the internal reset input) is held at positive four volts via a series resistor of one hundred ohms.

The PIC 2202 is programmed to supply and receive the necessary voltages to the conductive tracks 711, 712, 713 and 714 of the conductive layers 701 and 702. By this means the interface circuit is able to determine a measure, denoted by Z, of the pressure applied to the keyboard, and if this value is sufficiently large the interface circuit interprets this as a key-press. When a key-press is detected the interface circuit performs a measurement of the X and Y positional co-ordinates of where the pressure is being applied. The PIC is further configured to supply data to the output serial port 2203 relating to the position of key-presses detected or the absence of a key-press. The output is then correlated with a series of look-up tables in the electronic processor device which correlates the output provided with the specific key pressed and the data corresponding to that key is then registered within the electronic processor device.

An overview of the measurements made by interface circuit 2201 is illustrated by FIGS. 23A, 23B, 23C and 23D. The conductive layers 702 and 701 are represented schematically by potentiometers 2301 and 2302 and the resistance of the conductive path between the layers at the location of the applied force is represented by variable resistor 2303.

FIG. 23A

A first measurement is shown in FIG. 23A. Four volts are applied to connector 2204, while connector 2205 remains disconnected. Connector 2207 is connected to ground via a resistor 2211 of known value. Thus, current flows from connector 2204 through a first part of layer 701 indicated by a first part 2305 of potentiometer 2302, through the conductive path indicated by variable resistor 2303 having resistance Rv, through a first part of layer 702, indicated by a first part 2306 of potentiometer 2301 and through the known resistor 2211. The voltage, V1 appearing at connector 2207 is measured and since this is equal to the voltage drop across resistor 2211, V1 is directly proportional to the current flowing from connector 2204.

FIG. 23B

A second measurement is shown in FIG. 23B. Four volts are applied to connector 2206, while connector 2207 is disconnected. Connector 2205 is connected to ground via a resistor 2210 of known resistance. The voltage V2, dropped across resistor 2210 is measured. Voltage V2 is directly proportional to the current flowing through a second part of layer 702 indicated by a second part 2308 of potentiometer 2301, through the conductive path indicated by variable resistor 2303 having resistance Rv, through a second part of layer 701 indicated by a second part 2309 of potentiometer 2302 and through resistor 2210.

The sum of the resistance of first part 2306 and second part 2308 of potentiometer 2301 is approximately equal to the resistance between contacting portions 713 and 714 on layer 702, and is therefore substantially constant during the measurements, since they occur in rapid succession. Similarly, the sum of the resistance of first part 2305 and second part 2309 of potentiometer 2302 is approximately equal to the resistance between conductive tracks 711 and 712 on layer 701, and is also substantially constant during the measurements. As a result, the relationship 2310 exists between the resistance Rv, of the conductive path between the conductive layers 701 and 702, and the measured voltages V1 and V2, i.e. the resistance Rv between the conductive layers is proportional to the sum of the reciprocal of voltage V1 and the reciprocal of voltage V2.

In general, depending upon the type of position sensor used, the resistance Rv depends upon area of the applied pressure or a function of the area and the force as illustrated by relationship 2311. Thus, from the voltage measurements V1 and V2 a measure which is dependent on the force applied to the keyboard is determined.

FIG. 23C

A third measurement is shown in FIG. 23C. Four volts is applied to connector 2205 while connector 2204 is grounded, and so a potential gradient is produced across layer 701 represented by potentiometer 2302. A voltage measurement is made at connector 2207. Since the interface circuit makes use of the high impedance buffer 2208, the voltage appearing on layer 702 at the position of the applied force is determined. This voltage, V3 is directly proportional to the distance of the centre of the applied force from contacting portion 2111 of conductive track 711 and indicates its X-axis position.

FIG. 23D

A fourth measurement is shown in FIG. 23D. Four volts are applied to connector 2207 and connector 2206 is grounded. A voltage measurement is made of voltage V4 appearing at connector 2205. Voltage V4 is directly proportional to the distance of the centre of the applied force from contacting portion 2114 of conductive track 714 and indicates its Y-axis position. Therefore, voltage V3 and V4 provide information as to the two-dimensional position of the applied force on the sensor, i.e. voltages V3 and V4 represent X and Y values for the centre of the position of the applied force, representing a key-press.

FIG. 24

Figure 24:
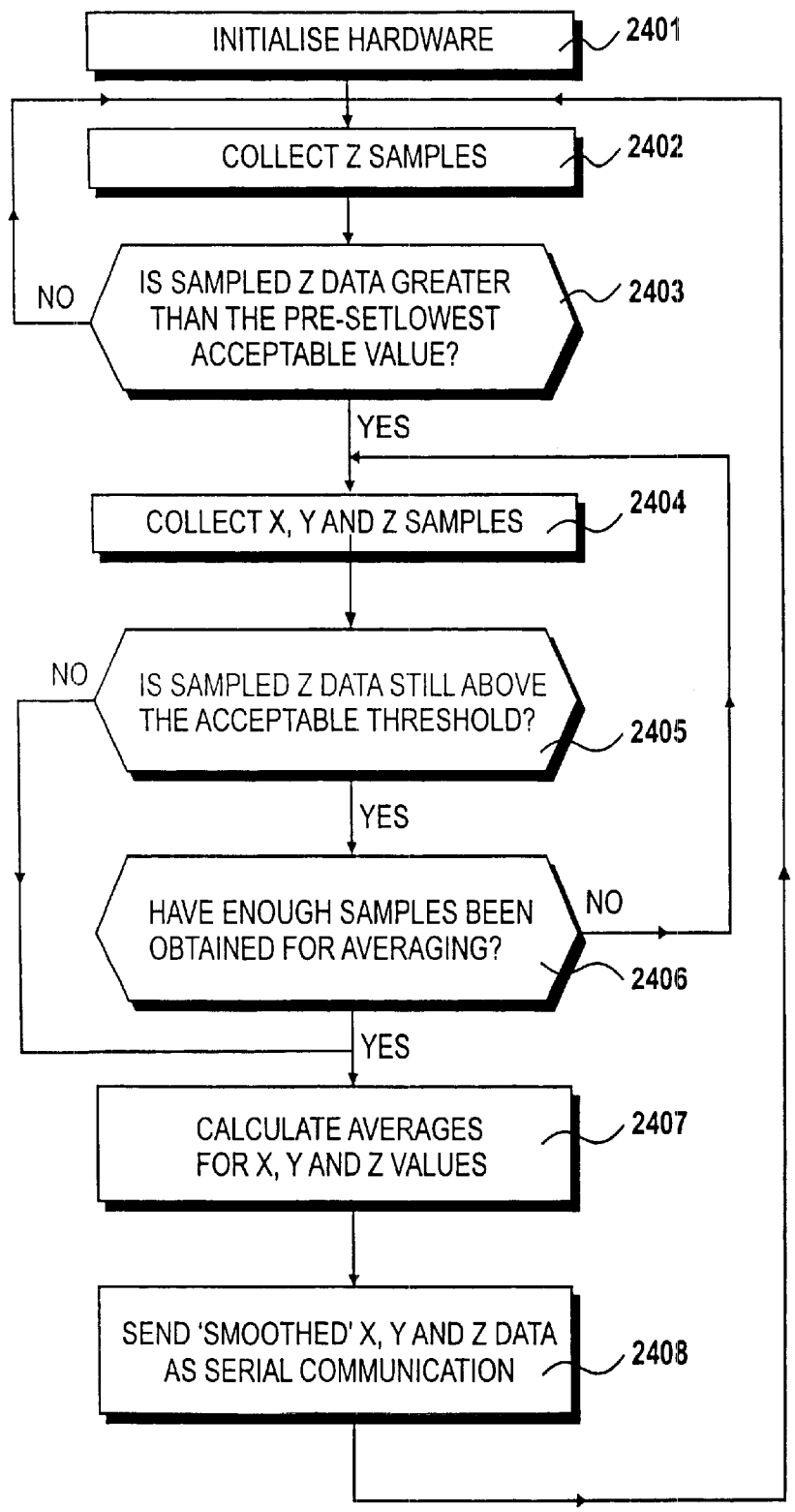
FIG. 24 is a flow chart illustrating a mode of operation performed by the PIC16C711 processor shown in FIG. 22.

The program running within the peripheral interface circuit of FIG. 22 is outlined in the flow chart of FIG. 24. At step 2401 the hardware is initialised and this process is detailed later with reference to FIG. 25. At step 2402 the circuit 2201 measures values of voltages V1 and V2 and calculates a Z value of the interaction. The details of step 2402 are described later with reference to FIG. 26. At step 2403 a question is asked as to whether the Z data is greater than a predetermined value. If the answer to this question is no then the program returns to step 2402. Thus the circuit measures Z values until a Z value greater than a predetermined value is detected. If the answer to the question at step 2403 is yes then the circuit measures voltages V1, V2, V3 and V4 and calculates a Z value at step 2404. Step 2404 is described later in more detail with reference to FIG. 27. At step 2405 a question is asked as to whether the calculated Z value is still above the predetermined value. If the answer to the question is yes, a further question is asked at step 2406 as to whether enough samples have been obtained. Typically, between three and ten sets of samples are taken, with lower numbers of sets of samples being taken when a fast response time is required. If the answer to the question at step 2406 is no then the program returns to step 2404 and a further set of measurements are made. When the answer to the question at step 2406 is yes, or when the answer to the question at step 2405 is no, then the program calculates smoothed values of the samples of the voltages V3 and V4, and of the values of Z which have been collected. Thus, the program measures a predetermined number of voltages before finding the smoothed values or, if the Z value drops below a predetermined value, the smoothed values are calculated immediately. By using a number of samples the effect of mains power electromagnetic interference or other such environmental noise may be minimised.

A simple calculation to find a smoothed value for say the X value, is to find the median of the maximum and minimum values of the stored values V3, i.e. a 'smoothed' value for X is found by adding the maximum stored value of V3 to the minimum stored value of V3 and dividing the result by two.

To further improve accuracy, values of X, Y, and Z that differ by a large amount from their immediately preceding and immediately subsequent values are excluded from the calculations of the smoothed value. In addition, known methods of eliminating mains electricity supply interference may be applied to the signals received from the sensor.

At step 2408 the median values for V3 and V4 representing X and Y positional co-ordinates and the averaged values of the Z data are output at the serial communication output 2203. The program then returns to step 2402 and looks for an indication of further mechanical interaction.

FIG. 25

Figure 25:
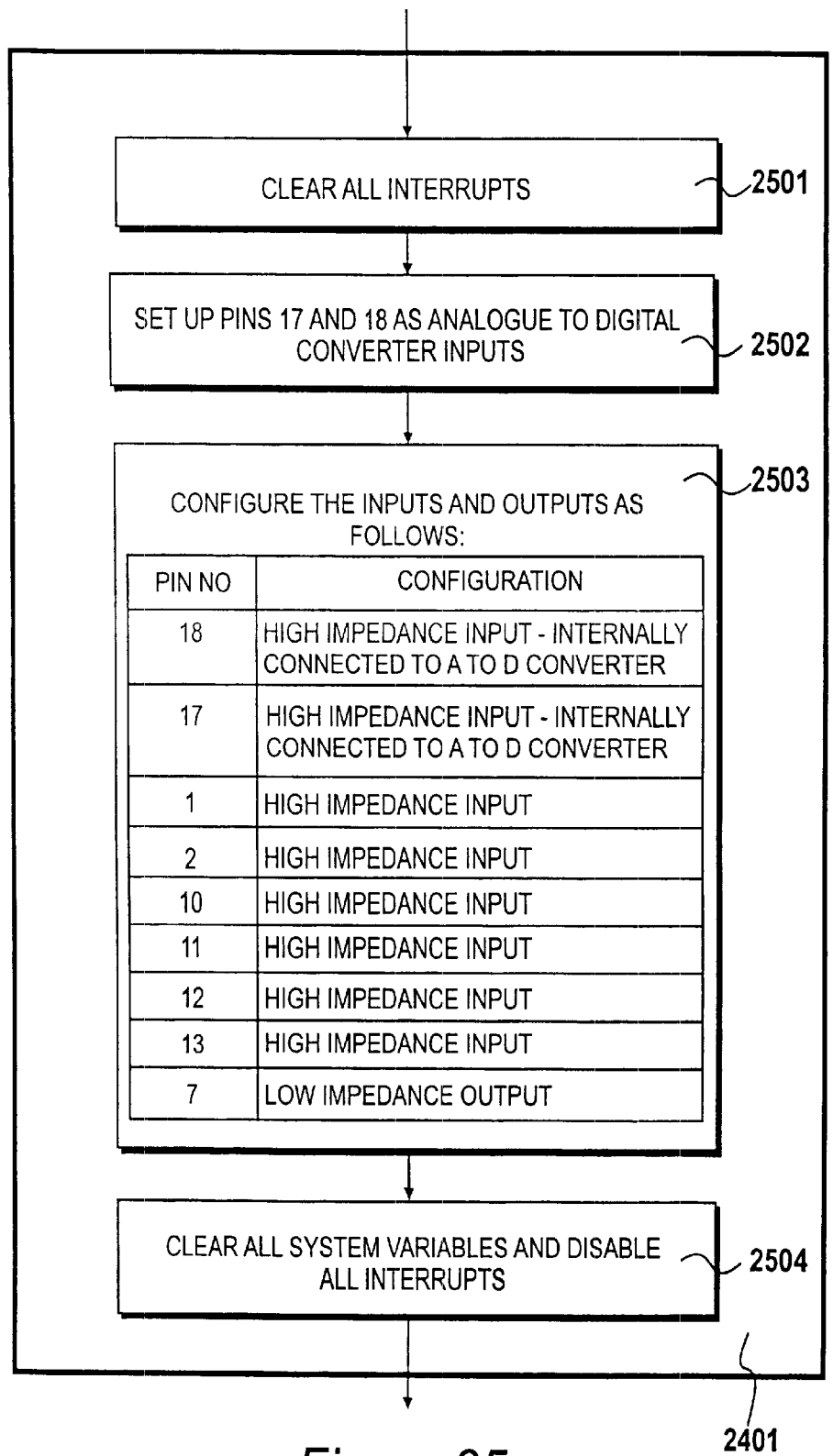
FIG. 25 is a flow chart detailing the initialisation procedure performed by the PIC16C711 processor at step 2401 shown in FIG. 24.

Step 2401 of FIG. 24 is shown in further detail in FIG. 25. Within the initialisation step 2401, at step 2501 the interrupts are cleared and then at step 2502 pins seventeen and eighteen are set up as analogue to digital converter inputs. The micro ports of a PIC16C711 may be configured as low impedance outputs or high impedance inputs. When in high impedance input mode, pins seventeen and eighteen can be programmed to connect via an internal multiplexer, to the analogue to digital converter. At step 2503 the ports which are to be used as inputs or outputs are configured in their initial state. At step 2504 all system variables are cleared and all interrupts are disabled.

FIG. 26

Figure 26:
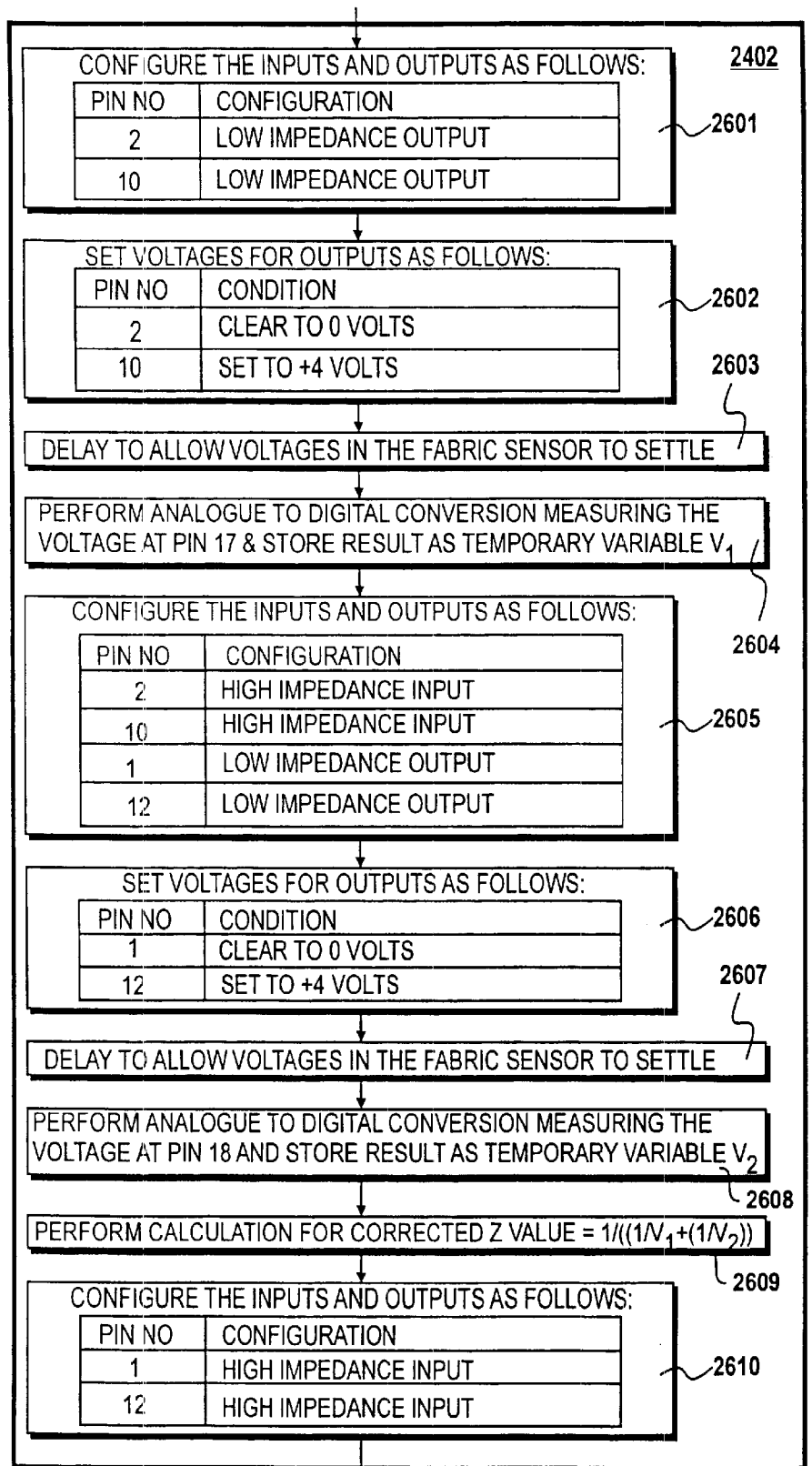
FIG. 26 is a further flow chart detailing the configurations of the PIC16C711 processor for the collection of Z value data as indicated in step 2402 of FIG. 24.

Step 2402 of FIG. 24 is shown in further detail in FIG. 26. Within step 2402, at step 2601, the ports corresponding to pins two and ten are reconfigured as output ports and at step 2602 pin two is set to zero while pin ten is set to positive four volts. Thus connector 2207 is grounded via resistor 2211 and four volts are applied to connector 2204. At step 2603 a time delay (typically of two hundred microseconds in a sensor measuring ninety millimeters by two hundred and forty millimeters with an conductive layer resistance of 3.5 Kohms) is provided to allow voltages to settle before the voltage at pin seventeen is measured and stored at step 2604. Thus voltage V1 present at connector 2207 is measured and stored.

At step 2605 pins two and ten are reconfigured as high impedance inputs while pins one and twelve are reconfigured as low impedance outputs. At step 2606 the voltages on pins one and twelve are set to zero and positive four volts respectively. Thus, connector 2205 is grounded via resistor 2210 while four volts are supplied to connector 2206. A suitable time delay, equivalent to that at step 2603, is provided at step 2607 before the voltage at pin eighteen is measured and stored at step 2608. Thus, the voltage present on connector 2205 is measured and stored as voltage V2. At step 2609 a Z value is calculated from stored voltages V1 and V2, and then stored. The pins one and twelve are reconfigured back to their initial state of high impedance inputs at step 2610.

FIG. 27

Figure 27:
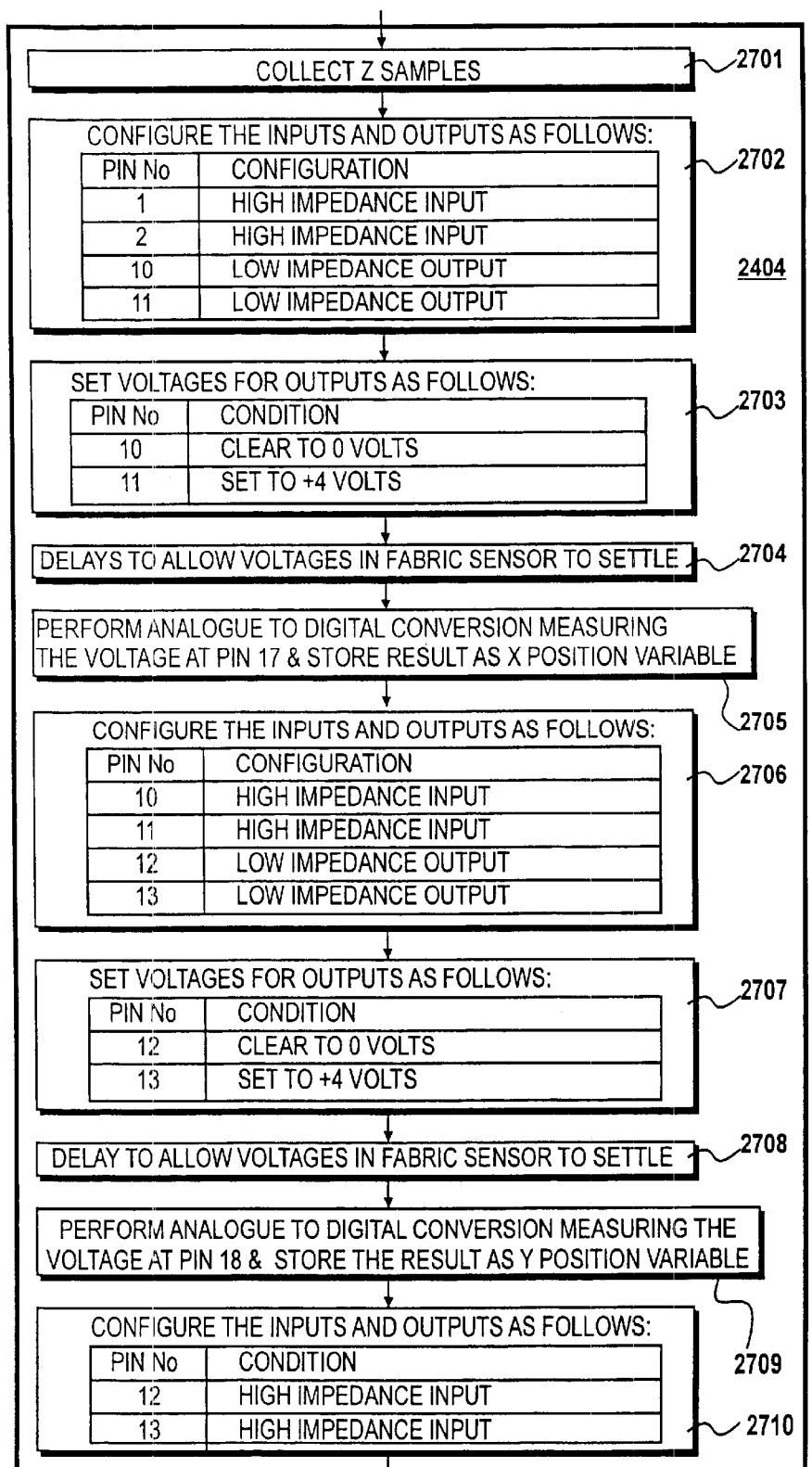
FIG. 27 is a flow chart detailing the configuration of the PIC16C711 processor for the collection of x and y positional co-ordinate data and z axis co-ordinate data as indicated in step 2404 of FIG. 24.

Step 2404 of FIG. 24 is shown in further detail in FIG. 27. Within step 2404, at step 2701 a Z value is collected in the same manner as at step 2402. At step 2702 pins one and two are reconfigured as high impedance inputs and pins ten and eleven as low impedance outputs. At step 2703 pin ten is set to zero volts and pin eleven is set to positive four volts. Thus, four volts are supplied to connector 2205 while connector 2204 is grounded. A delay is then provided at step 2704, (of typically two hundred microseconds for a device measuring ninety millimeters by two hundred and forty millimeters) to allow voltages in the sensor to settle before the voltage on pin seventeen is measured at step 2705. Therefore, a voltage V3 present on connector 2207 is measured which provides an indication of the X position of the applied force.

Pins ten and eleven are then reconfigured as high impedance inputs and pins twelve and thirteen are reconfigured as low impedance outputs at step 2706. The voltage on pin twelve is then set to zero while the voltage on pin thirteen is set to four volts at step 2707. Thus, four volts are supplied to connector 2207 while connector 2206 is grounded. A time delay is provided at step 2708, similar to that at step 2704, before the voltage appearing at pin eighteen is measured at step 2709. Thus, a voltage V4 present on connector 2205 is measured which provides an indication of the Y position of the applied force. Pins twelve and thirteen are then reconfigured back to their initial state of high impedance inputs.

Therefore, by the method described with reference to FIGS. 24 to 27 the interface circuit is able to make voltage measurements V3 and V4 which provide an indication of the position of the force applied to a fabric sensor, and measure voltages V1 and V2 which are proportional to currents passing through the sensor and provide information as to a second characteristic of the applied force. The second characteristic may be the pressure with which the force is applied, or a combination of the size of the force and the area. Furthermore, the circuit combines the voltages V1 and V2 to determine a Z value representative of the second characteristic.

The circuit 2201 provides output data representative of X and Y position of the applied force and the Z value. However, in an alternative embodiment the interface circuit provides output data corresponding to the measured voltages V1, V2, V3 and V4.

FIG. 28

Figure 28:
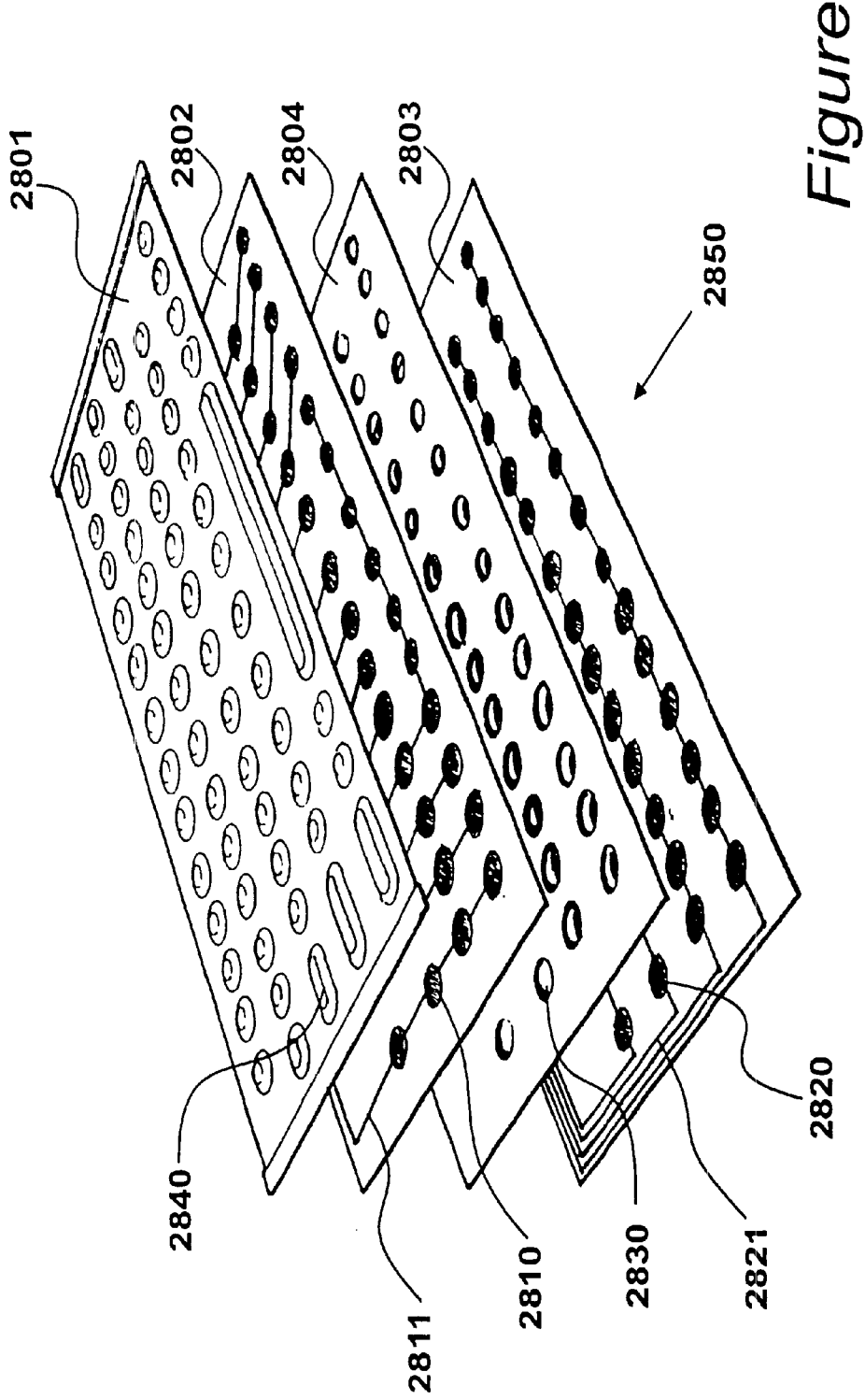
FIG. 28 is an exploded view of an alternative membrane keyboard 202.

An alternative embodiment to the fabric keyboard 202, as previously described in reference to FIG. 7, is shown in FIG. 28. In this embodiment, the keyboard 2850 is a membrane keyboard and is shown in an exploded perspective view in FIG. 28 to illustrate the constituent layers. The four layers shown in FIG. 28 are intended to replace layers 701 to 709 of FIG. 7. Therefore layers 2801, 2802, 2803 and 2804 shown in FIG. 28 would reside above a support layer such as 750 (or any alternative embodiment of the support layer described herein). The functionality of the lower fabric layer 710 would also be retained for the reconfiguration of the support layer 750 to the second rigid configuration as shown in FIGS. 9A and 9B.

The uppermost layer is a silicone rubber moulded layer 2801, identical to layer 704 previously described in reference to FIG. 7. This layer is laminated on the upper surface with a durable fabric layer such as layer 703 (described in reference to FIG. 7), onto which graphical icons corresponding to the individual keys are printed. In an alternative embodiment, the uppermost layer is laminated with a durable flexible plastic film, such as the polyester or polyvinyl chloride film, onto which the graphics corresponding to each key are printed.

The membrane keyboard 2801 comprises a first electrically conductive membrane film 2802 and a second electrically conductive membrane film 2803. In addition, a spacing membrane layer 2804 is positioned in between the first electrically conductive membrane layer 2802 and the second electrically conductive membrane layer 2803.

The first electrically conductive membrane layer 2802 is a film of Mylar$^{RTM}$ (polyethylene terephthalate). Onto the underside of the film 2802 electrodes (formed from silver-loaded ink), such as 2810, are printed forming the electrical conductivity portions of the first electrically conductive membrane. The electrodes are connected to an interface circuit which supplies voltages to the electrodes, such as electrode 2810, via conductive tracks, such as 2811. Each electrode is specifically aligned so as to correspond with a key registration device on the layer 2801. For example, the electrode 2810 corresponds to the centre of the 'CAPS LOCK' key 2840.

The second electrically conductive membrane layer 2803 is also composed of Mylar$^{RTM}$ membrane having silver-loaded ink electrodes such as 2820 printed onto the upper surface which forms the electrical conductivity of the second electrically conductive membrane layer Each of the electrodes printed onto the upper surface of layer 2803 is aligned with a corresponding electrode on layer 2802 and a corresponding key registration device on layer 2801. For example, electrode 2820 on layer 2803 is specifically aligned with electrode 2810 on layer 2802 and the 'CAPS LOCK' key 2840 on layer 2801.

A separator layer 2804 is a non-conductive membrane sheet of Mylar$^{RTM}$ with holes, such as 2830, located to coincide with the electrodes printed on to the surfaces of layers 2802 and 2803. For example, the hole 2830 is specifically aligned with the electrode 2810 on layer 2802 and the electrode 2820 on layer 2803.

The separator layer 2804 prevents an electrical contact occurring between the electrodes of layers 2802 and 2803 unless a mechanical interaction has occurred by pressing a key on layer 2801. For example, the 'CAPS LOCK' key 2840, when pressed, causes the compression of the electrode 2810 towards the electrode 2820 through the hole 2830 in the separator layer 2804.

Accordingly, if a voltage is supplied to the electrode 2810 via the conductive track 2811, a press of the 'CAPS LOCK' key will form an electrical contact between the electrode 2810 of layer 2802 and the electrode 2820 of layer 2803. Therefore, a voltage output is detectable in the conductive track 2821 on layer 2803. As the depression of the 'CAPS LOCK' key is the only key that would produce a voltage output in conductive track 2821 when a voltage has been applied to the conductive track 2811, then, by detecting this voltage output, the interface circuit is able to correlate the output with the corresponding electrical connections formed. This data is either correlated with look-up tables in the interface circuit to assign the correlating 'CAPS LOCK' function output with the key press or the look-up table correlation is performed in the electronic processor following an output indicating the connections formed and the output detected.

In an alternative embodiment, the membrane layers 2802, 2803 and 2804 are made of an alternative plastics material such as polyester or polyvinyl chloride. In further alternative embodiments, layer 2803 may be made from any insulating plastic material or from a suitable fabric.

FIG. 29

Figure 29:
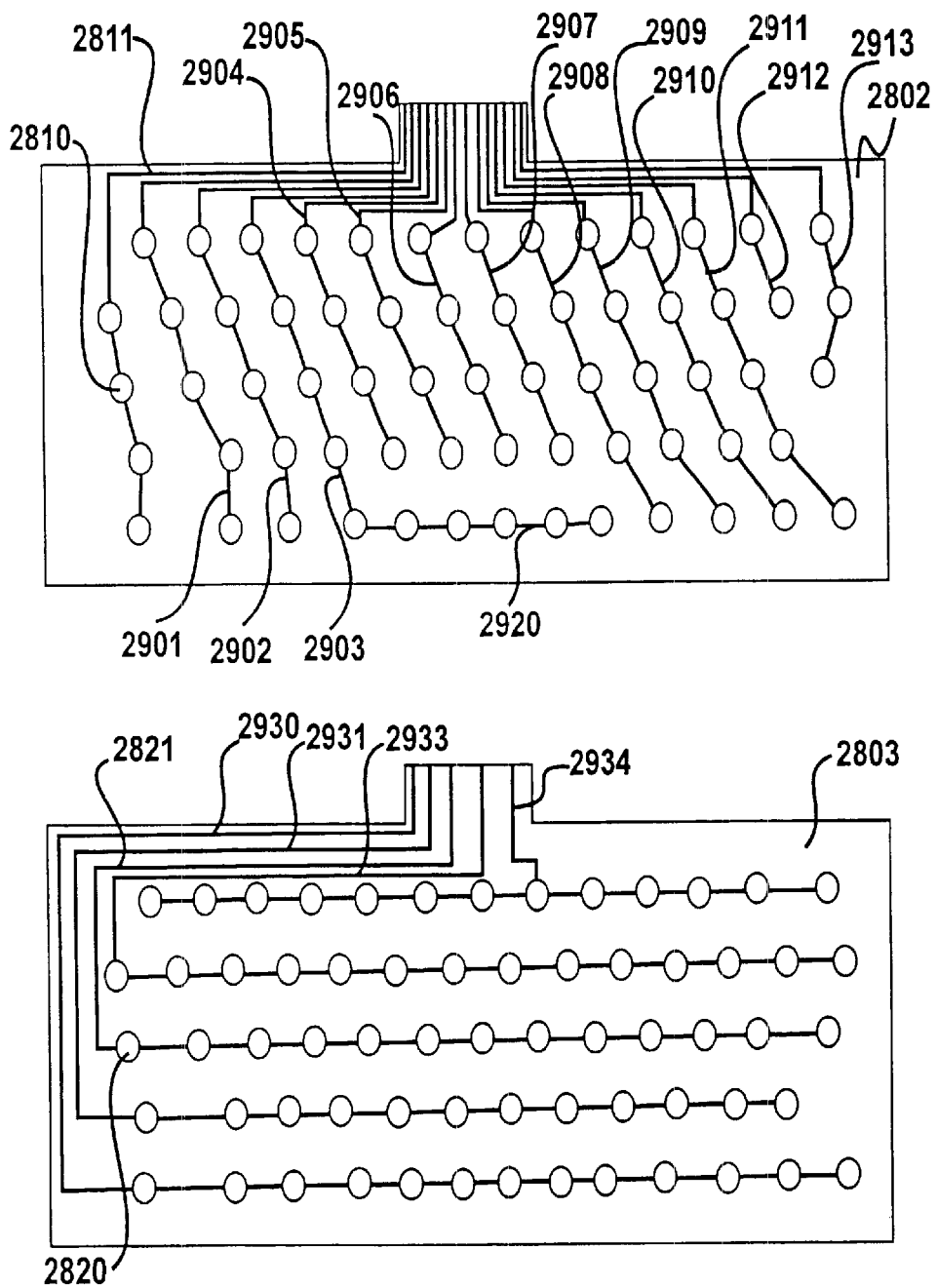
FIG. 29 is a detailed view of the electrically conductive membrane layers 2802 and 2803 shown in FIG. 28.

The electrically conductive membrane layer 2802 is shown in more detail in FIG. 29. The layer 2802 has a conductive electrode, such as 2810, for each key of the keyboard and the elongate space bar, in this embodiment, has six corresponding electrodes as indicated at 2920. Voltages are applied to the electrodes via conductive tracks 2811 and 2901 to 2913 which are generally arranged to define fourteen columns respectively. The conductive tracks 2811 and 2901 to 2913 extend to form a connection with the interface circuit (not shown). In this embodiment, the interface circuit can form a connection independently with each conductive track as will be described later in reference to FIG. 30.

The second electrically conductive membrane layer 2803 is also shown in FIG. 29. Each conductive electrode printed on the surface of membrane layer 2803, such as 2820, is connected by one of five conductive tracks 2821 and 2930 to 2934. In contrast to the first electrically conductive layer 2802, the conductive tracks of the second membrane layer 2803 effectively connects the electrodes to define a series of five rows that extend near perpendicularly to the columns defined by the conductive tracks on layer 2802. Accordingly, each key, when pressed, will only produce an output in a specific row following the application of a voltage to a specific column defined on layer 2802. For example, if a voltage is supplied to conductive track 2903 which extends to form connections to the six electrodes corresponding to the space bar key as indicated at 2920, and the space bar key is depressed, a voltage output will be detectable in conductive track 2930 of layer 2803. The depression of the space bar key is the only key that will produce an output in conductive track 2930 when a voltage is supplied to the conductive track 2903.

There are many alternative configurations that the electrodes and conductive tracks may take to essentially achieve the same function to that shown in FIG. 29. In one such example of an alternative embodiment, the conductive rows and columns are effectively printed onto the same membrane layer such that, at a given position corresponding to a key registration device, the printed electrodes of a specific row and column terminate so as to provide an open circuit with electrodes adjacent to each other in the area of a key. In this embodiment, attached to the underside of each key registration device is a 'pill' of conductive material such as carbon which, when the key is depressed, contacts and bridges the gap between the respective column and row terminal to form a closed circuit. In a similar manner to that described in reference to FIGS. 28 and 29, the detection of an output voltage in a particular row in response to a voltage supplied to a particular column will be indicative of a specific key press.

FIG. 30

Figure 30:
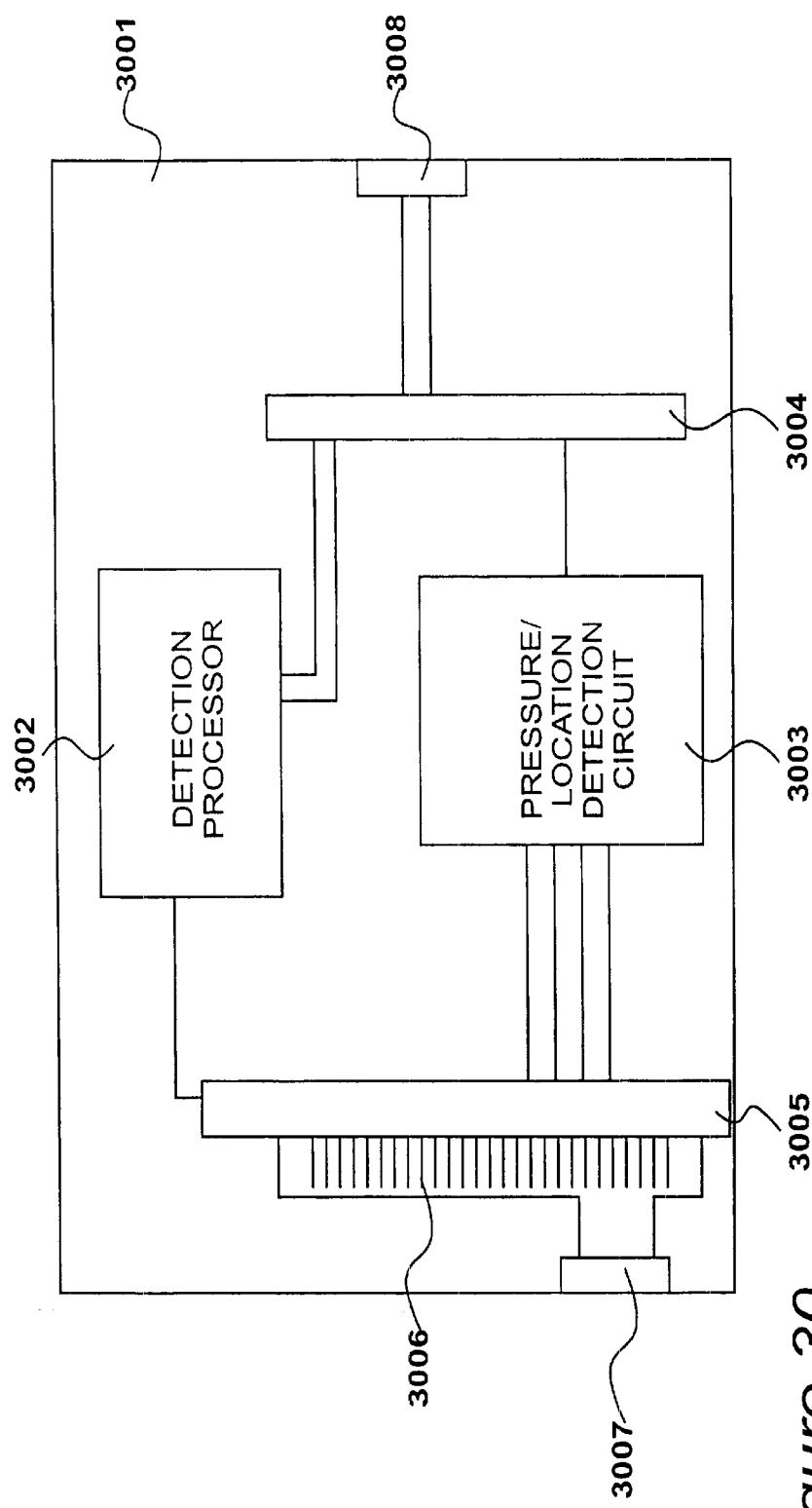
FIG. 30 details the modified interface circuitry for the operation of the membrane keyboard shown in FIGS. 28 and 29.

In order to enable the detection of a key press within an area of the keyboard described in FIGS. 28 and 29, the interface circuit is arranged as shown in FIG. 30. The interface circuit 3001 includes a detection processor 3002, a pressure/location detection circuit 3003, a switching circuit 3004, a multiplex switch 3005 having electrical connection inputs elements 3006, an input socket 3007 and an output socket 3008 provided to allow connection to the electronic processor device.

Each of the five conductive tracks that define five rows on membrane layer 2803 has an individual connection formed thereto and each of the fourteen conductive tracks that define columns of membrane layer 2802 has a connection formed thereto. Consequently there are nineteen connections formed between the interface circuit and the keyboard. The wires corresponding to each connection are fed individually to the input elements 3006 of multiplex switching circuit 3005.

If a key is pressed on the keyboard, the interface circuit 3001 provides an output identifying the location of a mechanical interaction. Voltages are applied to the keyboard through the pressure/location detection circuit 3003 which is essentially the same as the circuit shown in FIG. 22. The circuit shown in FIG. 22 forms four connections which, in the interface circuit of the present embodiment, are connected to multiplex switch 3005. In this embodiment, only two connections of the circuit shown in FIG. 22 are utilised. For example, voltages are applied to the conductive tracks of layer 2802 via connection 2204 and connection 2207 is connected to the conductive tracks of layer 2803 to detect any output voltages. The precise arrangement of the connections formed at any given time is determined by the multiplex switch, under the control of the detection processor. In a first mode of operation, the multiplex switch conducts a sequential scan of each row following the application of a voltage to each conductive column on layer 2802.

If an output is detected via connector 2207 in response to a key press, the pressure location detection circuit produces an output which is sent via the switching circuit 3004 to the detection processor 3002 where the output is correlated with the precise connection formed and positional information corresponding to the connections formed and the output received are sent to the electronic processor via the switching circuit 3004 and the output socket 3008. In the present embodiment, the electronic process correlates this data with look-up tables to determine the corresponding alpha numerical or function input to which the key pressed relates.

In an alternative embodiment, to reduce the number of operations required to determine which key has been pressed and hence increase the speed with which a key press is detected, the multiplex switch 3005, in an initial state under the control of the detection processor 3002, connects the pressure/location detection circuit 3003 to all five conductive tracks on layer 2803 and a second connection to all fourteen conductive tracks on layer 2802. A total of two connections to the pressure location detection circuit 3002 are made. If, on viewing these terminals, an open circuit is present, no mechanical interaction has occurred on the alpha-numeric keyboard. Alternatively, if a closed circuit is identified, this indicates the presence of a mechanical interaction and an output to this effect is supplied to switching circuit 3004 which in turn conveys this information to the detection processor 3002 and to output socket 3008.

On detection of a mechanical interaction, the multiplex switch 3004 under the control of detection processor 3002, maintains the connection of the pressure/location detection circuit 3003 to layer 2803, and a single connection is made from the pressure/location detection circuit to the leftmost seven of the conductive tracks 2811 and 2901 to 2906 of layer 2802. Again the pressure/location detection circuit 3003 detects the presence of a closed or open circuit; a closed circuit indicating one or more key presses in the leftmost half of the alpha-numeric keyboard. An output indicative of an open or closed circuit is supplied to the switching circuit 3004 which in turn conveys this information to the detection processor 3002 and to output socket 3008.

The multiplex switching circuit is then commanded by the detection processor to disconnect the connection to the seven leftmost conductive tracks of layer 2802 and make connections from the pressure/location detection circuit 3003 to the remaining seven conductive tracks 2907 to 2913 respectively. Again an open or closed circuit is detected and the information relayed to the detection circuit 3002. A closed circuit at this stage indicates one or more key presses in the rightmost half of the QWERTY keyboard outline.

The connections to the pressure/location detection circuit 3003 are maintained by the detection processor while the pressure location detection circuit provides an output indicative of a mechanical interaction. When a mechanical interaction is no longer indicated, the detection processor returns the multiplex switch back into the initial state.

Alternatively, if one or more key presses are detected relating to either the seven leftmost conductive tracks 2811, 2901 to 2906, then the detection processor 3002 performs a binary search to identify the conducting row and column intersection at which a mechanical interaction is present. The circuit does this by a process of elimination. For example, if a key press is not detected in the columns relating to conductive tracks 2907 to 2913 then no further search is necessary in respect of these columns. But, if a key press is detected in the seven leftmost conducting columns relating to conductive tracks 2811 and 2901 to 2906, the multiplex switch 3005 under the control of detection processor 3002 makes connections from pressure/location detection circuit 3003 to the first four conductive tracks 2811 and 2901 to 2903 of layer 2802 and a further connection to the five conductive tracks on layer 2803. Pressure/location detection circuit 3003 detects the presence of an open or closed circuit and provides an indicative output to detection processor 3002. The multiplex switch 3005, then makes a connection from pressure/location detection circuit 3003 to the next three attachment portions 2904 to 2906 while maintaining the connections to the five conductive tracks of layer 2803. The pressure/location detection circuit 3003 detects the presence of an open or closed circuit and provides an indicative output to detection processor 3002.

Thus, the control circuit identifies if just one or both of the two groups of four columns is subject to a key press. If just one of the two groups is identified as relating to a key press, then this group only is interrogated and the other group is eliminated from further search. But if both groups are identified as relating to a key press, then both groups will need to be interrogated further.

The process of binary search is continued in this manner until the identity of the individual columns relating to the key press or presses is established. A similar process is then followed to establish which of the rows contains the key press or presses. This is done by making connection of the location detection device to all fourteen conductive tracks of layer 2802 and a second connection to a varying number of the conductive tracks of layer 2803. Having established both the row and the column, the detection processor 3002 then provides an output indicating the location(s) to output socket 3008 via the switching circuit 3004. The detection processor then resets the multiplex switching circuit to its initial state in readiness for the next mechanical interaction to be detected.

FIG. 31

Figure 31:
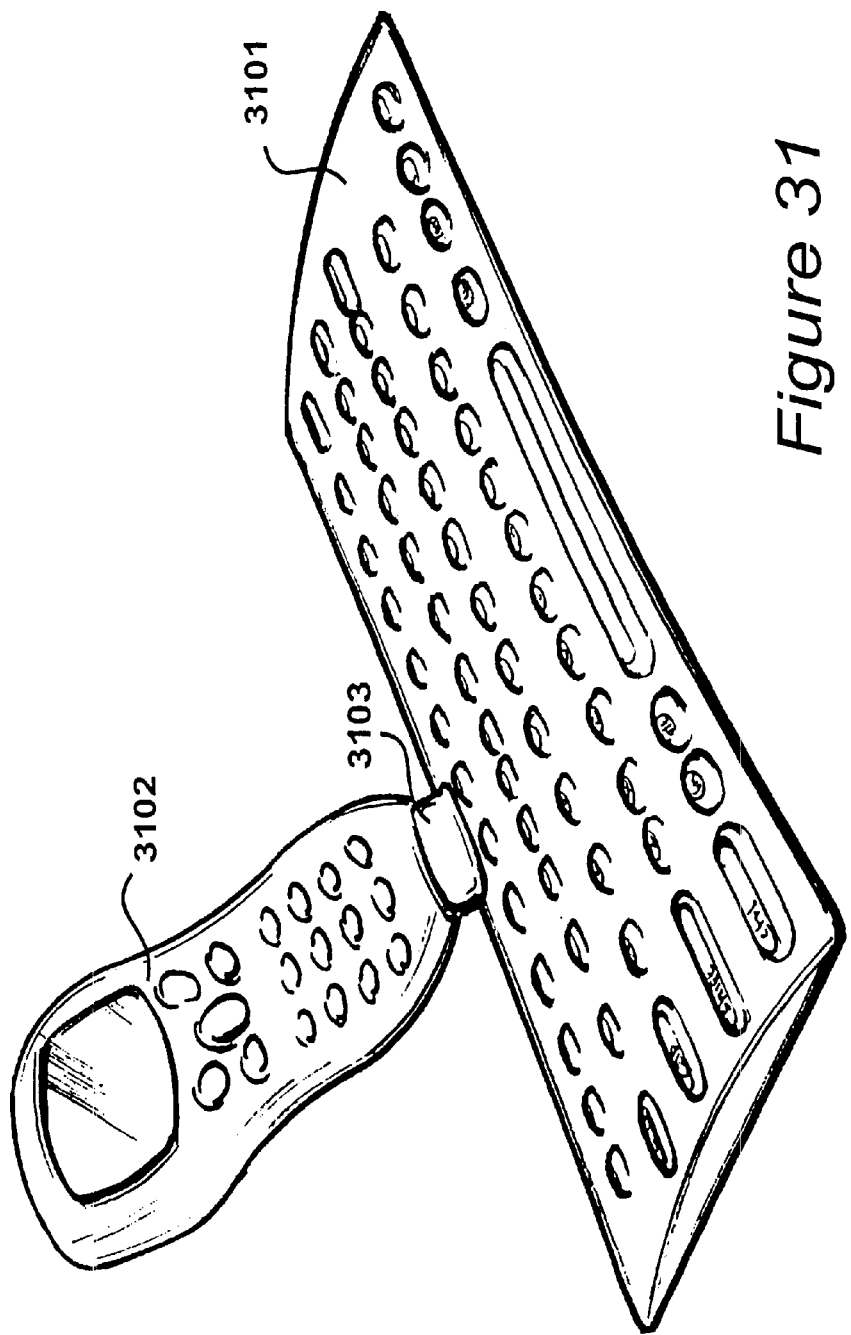
FIG. 31 is a perspective view of a data input device according to the present invention interfaced to a mobile phone.

The keyboard 202 can be used with any portable equipment where data entry is required or is considered desirable. A further example is shown in FIG. 31, in which a flexible keyboard 3101 is shown in a second rigid configuration and is attached to a mobile cellular telephone 3102 via a suitable interface 3103. Typically, communications interfaces of mobile cellular telephones are responsive to AT commands as is well known in the art. Particular implementation of an interface device 3103 will, however, require modification in order to facilitate connection to a particular mobile phone variety and information may be required from a mobile telephone company in order to fully secure an appropriate link without invalidating warranty's.

Increasingly, mobile telephones similar to telephone 3102 are being used for the transmission of text messages, that may be achieved using second generation GSM standard via the SMS procedure. Text communication is further enhanced by WAP technologies and applications for third generation mobile telephones. Thus, a keyboard of this type becomes particularly attractive when the telephone is being used for email or web browsing applications. Therefore, a relatively small telephone can be given functionality substantially similar to that provided by more sophisticated models, such as the Nokia Communicator 9000.

FIG. 32

Figure 32:
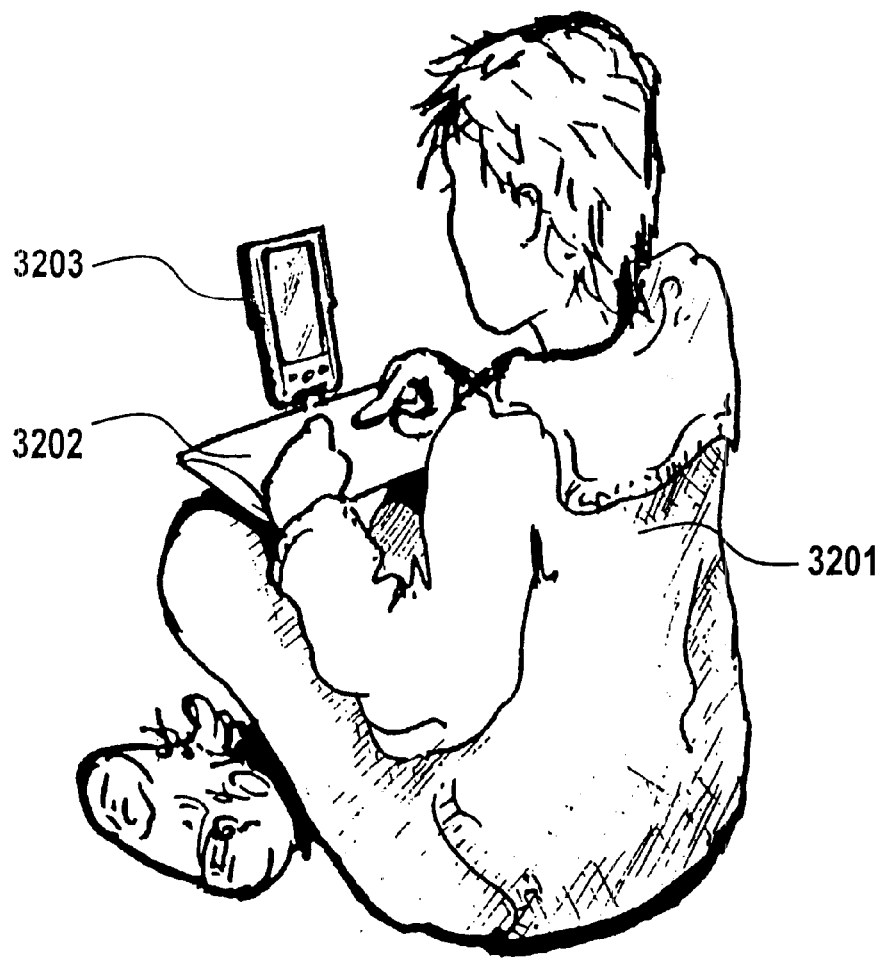
FIG. 32 shows an alternative embodiment of a data input device according to the present invention in use and connected to a portable electronic processor unit running games software.

An alternative embodiment of a data input device according to the present invention is shown in use by an operator in FIG. 32. In this situation, the operator 3201 is a child interacting with a data input device 3202 which, in this embodiment, is a games console connected to a portable electronic processor 3203 operating games software. The games console 3202 is shown in FIG. 32 in a second rigid configuration with the operator 3201 supporting the games console 3202 between their knees. Furthermore, the operator 3201 can interact with the games console 3202 by providing mechanical interactions to the game console's surface which is translated into game control data which is transmitted via the interface circuit to the electronic processor 3203. The particular implementation of the interface circuit will require appropriate modification to facilitate connection to a particular variety of portable electronic processor used. In the present embodiment, the electronic processor is a Handspring Visor Prism$^{RTM}$ which is connected to the games console 3202 via a serial input socket. Therefore, the operator 3201 can select game functions by pressing the surface of the games console 3202 which enables the operator to interact with a game program running on the electronic processor 3203. When the operator has finished using the games console 3202 in combination with the electronic processor 3203 the games console may be reconfigured to the first flexible configuration wherein the games console 3202 may be bent about an axis so as to wrap the games console 3202 around the electronic processor 3203 for transportation and storage.

As before, the rigid games console surface enables the operator to use the console in situations where there is no adequate support surface on which to place a flexible device.

What is claimed is:

1. A data input device suitable for inputting data to electronic processing means and configured to produce an output in response to a mechanical interaction, wherein
    said data input device comprises a rigidising support layer, such that said data input device is configurable between a rigid configuration in which said support layer provides a curvature that inhibits bending or flexing of said device about a first axis and a flexible configuration in which said curvature is removed such that said device may be bent or flexed about said first axis.

2. A data input device according to claim 1, wherein the maximum beam thickness of said data input device is greater in said rigid configuration than in said flexible configuration.

3. A data input device according to claim 1, wherein, in said flexible configuration said device may be reconfigured from an operational configuration in which said electronic processing means is displaced from said keyboard to a wrapped up configuration in which said device is bent about a first and second axis about said electronic processing means.

4. A data input device according to claim 3, wherein said first and second axis are parallel.

5. A data input device according to claim 1, wherein said rigidising support layer has an arched cross-sectional profile in said rigid configuration and has a substantially flat cross-sectional profile in said flexible configuration.

6. A data input device according to any preceding claim, wherein said device is reconfigured from said flexible configuration to said rigid configuration by a reconfiguration means.

7. A data input device according to claim 6, wherein said reconfiguration means is an under-surface layer of said device having a first portion and a second portion separated by a gap having a closure means, said closure means arranged to configure said device in the flexible configuration when said gap is open and to configure said device in the rigid configuration when said gap is closed.

8. A data input device according to claim 7, wherein said closure means is a zip fastener.

9. A data input device according to claim 1, wherein said rigidising support layer is a layer of semi-flexible material.

10. A data input device according to claim 1, wherein said rigidising support layer comprises a plurality of corrugations arranged parallel to said first axis.

11. A data input device according to claim 10, wherein, in said flexible configuration, said corrugations facilitate bending of said rigidising support layer about said first axis.

12. A data input device according to claim 1, wherein said rigidising support layer comprises a plurality of semi-flexible support rods arranged substantially parallel to said first axis; and said rods are bound together by a plurality of intertwined fabric fibres.

13. A data input device according to claim 12, wherein said support rods have a greater cross-sectional diameter than said fabric fibres.

14. A data input device according to claim 12, wherein said fabric fibres are multi-filament polyester yarns.

15. A data input device according to claim 12, wherein, in said rigid configuration, said support rods have a substantially arched configuration and, in said flexible configuration, said support rods have a substantially flat configuration.

16. A data input device according to claim 1, wherein said rigidising support layer comprises a plurality of support portions.

17. A data input device according to claim 16, wherein, in said rigid configuration, each of said support portions has an arched cross-sectional profile and in said first flexible configuration, each of said support portions has a substantially flat cross-sectional profile.

18. A data input device according to claim 16, wherein said support portions are elongate lengths of sprung steel.

19. A data in put device according to claim 16, wherein said support portions extend substantially perpendicular to said first axis.

20. A data input device according to claim 16, wherein said support portions are mounted onto a fabric layer.

21. A data input device according to claim 1, wherein said data input device is a games console.

22. A data input device according to claim 1, wherein said electronic processor is selected from the group comprising a hand-held electronic processor and a mobile phone.

23. A data input device according to claim 1, wherein the maximum beam thickness of said rigidising support layer is greater in said rigid configuration than in said flexible configuration.

* * * * *